United States Patent
Fluharty et al.

(10) Patent No.: US 10,465,571 B2
(45) Date of Patent: Nov. 5, 2019

(54) OIL FLOW SYSTEM FOR ENGINE CYLINDER DEACTIVATION

(71) Applicant: Ford Global Technologies, LLC, Dearborn, MI (US)

(72) Inventors: Jeff D. Fluharty, Woodhaven, MI (US); Jonathan Denis Crowe, Northville, MI (US); John Christopher Riegger, Ann Arbor, MI (US); James E. Froling, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 15/621,785

(22) Filed: Jun. 13, 2017

(65) Prior Publication Data

US 2018/0355770 A1 Dec. 13, 2018

(51) Int. Cl.

| F01L 9/02 | (2006.01) |
|---|---|
| F01L 13/00 | (2006.01) |
| F01M 9/10 | (2006.01) |
| F02D 13/02 | (2006.01) |
| F01L 1/18 | (2006.01) |
| F02D 13/06 | (2006.01) |
| F01L 1/047 | (2006.01) |
| F01L 1/24 | (2006.01) |
| F01L 1/344 | (2006.01) |
| F01L 1/053 | (2006.01) |

(52) U.S. Cl.
CPC ............. *F01L 13/0005* (2013.01); *F01L 1/18* (2013.01); *F01M 9/106* (2013.01); *F02D 13/02* (2013.01); *F02D 13/06* (2013.01); *F01L 1/24* (2013.01); *F01L 2001/0476* (2013.01); *F01L 2001/0537* (2013.01); *F01L 2001/186* (2013.01); *F01L 2001/2444* (2013.01); *F01L 2001/34433* (2013.01); *F01L 2013/001* (2013.01); *F01L 2013/105* (2013.01)

(58) Field of Classification Search
CPC . F01L 13/0005; F01L 2001/2444; F01L 1/24; F01L 2001/0476; F01L 2001/34433; F01L 2013/001
USPC ................................ 123/90.12, 90.13, 90.33
See application file for complete search history.

(56) References Cited

U.S. PATENT DOCUMENTS

| 6,810,842 | B2 | 11/2004 | Itou |
| 7,784,438 | B2 | 8/2010 | Lee |
| 8,667,944 | B2 | 3/2014 | Beyer |
| 8,813,699 | B2 | 8/2014 | McConville et al. |
| 9,650,922 | B2 | 5/2017 | McConville |
| 9,765,656 | B2 * | 9/2017 | Beyer ............... F01L 1/047 123/90.12 |
| 2009/0205601 | A1 | 8/2009 | Baker |
| 2016/0281551 | A1 | 9/2016 | Crowe |

FOREIGN PATENT DOCUMENTS

EP 1892387 A1 2/2008

* cited by examiner

*Primary Examiner* — Ching Chang
(74) *Attorney, Agent, or Firm* — Geoffrey Brumbaugh; McCoy Russell LLP

(57) ABSTRACT

Methods and systems are provided for an engine oil system of a cylinder head. In one example, an engine oil system may include a first oil gallery and a second oil gallery fluidly coupled to each other via a plurality of oil chambers. Each oil chamber includes a plug, and one or more of the plugs may include a slot shaped to direct a flow of engine oil from a solenoid valve to the second oil gallery.

13 Claims, 10 Drawing Sheets

OIL FLOW SYSTEM FOR ENGINE CYLINDER DEACTIVATION

FIELD

The present description relates generally to methods and systems for controlling a flow of oil within a vehicle engine system.

BACKGROUND/SUMMARY

Variable displacement engines often employ a valve deactivation assembly including a rolling finger follower that is switchable from an activated mode to a deactivated mode. One method for activating and deactivating the roller finger follower (e.g., a rocker arm) includes utilizing an oil-pressure actuated latch pin disposed within an inner arm of the roller finger follower. In the activated mode, the latch pin engages the inner arm and outer arm together in a latched condition to actuate motion of the outer arm via motion of the inner arm. The outer arm moves a poppet valve to control the intake of gases into the combustion chamber or to exhaust gases from the combustion chamber. In the deactivated mode, the inner arm is disengaged from the outer arm in an unlatched condition, and the motion of the inner arm is not translated to the outer arm and the poppet valve, thereby resulting in a lost motion.

As is typical in the valve deactivator art, mode transitions, either from the latched condition to the unlatched condition, or vice versa, occur only when the roller follower is engaging a base circle portion of the cam. This ensures that the mode change is occurring while the valve deactivator assembly, and more specifically the latching mechanism, is not under a load. Due to the high rotational speed of a cam, it is desirable, but difficult, to reduce the amount of time needed to transition from a latched condition to an unlatched condition in order to execute the transition during a single base circle period. The inventors herein have recognized that one problematic issue that may arise during mode transitions of a rolling finger follower including an oil-pressure actuated latch pin is the presence of air trapped within the latch pin hydraulic circuit. Air trapped within the hydraulic circuit is compressible and increases the amount of time needed to switch from the latched condition to the unlatched condition or vice versa.

The latch pin hydraulic circuit of a switching rolling finger follower may be primed with hydraulic pressure while operating in the latched condition to facilitate the transition to the unlatched condition. In one example, this priming is achieved by utilizing a dual-function hydraulic lash adjuster (HLA) which is configured to provide hydraulic fluid to a latch pin hydraulic circuit at one of a first, lower pressure or a second, higher pressure. The first and second pressures are present at an upper feed port of the hydraulic lash adjuster based on a state of an oil control valve. The hydraulic lash adjuster directs the hydraulic fluid to the latch pin hydraulic circuit via a single port located in a plunger of the lash adjuster. One example approach is shown by Hendriksma et al. in E.P. 1892387. Therein, a dual feed hydraulic lash adjuster is equipped to supply oil to two adjacent oil galleries for valve actuation mechanisms of a cylinder. The two oil galleries are fluidly coupled within the hydraulic lash adjuster in order to provide varying hydraulic fluid pressures to the valve actuating mechanisms dependent on engine conditions. A first gallery flows higher pressure hydraulic fluid to the second gallery in order to carry trapped air in the second oil gallery to a pressure relief valve.

However, the inventors herein have recognized potential issues with such systems. As one example, fluidly coupling a first gallery to a second gallery within a hydraulic lash adjuster may increase a cost and/or complexity of the hydraulic lash adjuster and may result in a greater difficulty of maintenance of the engine oil system.

In one example, the issues described above may be addressed by a system comprising: a first plurality of oil passages, a second plurality of oil passages, and an oil chamber, all disposed within an engine cylinder head; a plug housed within the oil chamber and including a slot fluidly coupled to a first section of the second plurality of oil passages; and a clearance formed between the plug and the oil chamber, the clearance fluidly coupling the first and second pluralities of oil passages. In this way, oil may flow through the clearance from the first plurality of passages to the second plurality of passages.

As one example, each plug may direct engine oil toward separate hydraulic lash adjusters, via the second plurality of passages and a corresponding slot of each plug, with the hydraulic lash adjusters coupled to the second plurality of passages being adjustable between an activated mode and a deactivated mode. The plugs fluidly separate sections of the second plurality of passages in order to enable cylinders of the engine to be individually deactivated. Additionally, oil flowing through the clearance formed by each plug may reduce an amount of air present within the first and second pluralities of passages, thereby reducing a likelihood of airflow into inlets of the hydraulic lash adjusters. Reducing the amount of air within the engine oil system may reduce a likelihood of degradation of the oil system and increase an ease of maintenance of the system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-9 are shown to scale, although other relative dimensions may be used, if desired.

DETAILED DESCRIPTION

The following description relates to systems and methods for controlling a flow of oil in a cylinder valve actuation system within a vehicle engine system. An engine system of a vehicle, such as the vehicle shown by FIG. 1, includes a plurality of cylinders capped by a cylinder head, such as the cylinder head shown by FIGS. 3-4. Each cylinder may receive intake air via one or more intake valves and may exhaust combustion gases (e.g., combusted air/fuel mixture) via one or more exhaust valves, with each intake valve and each exhaust valve being coupled to separate rocker arms and being actuatable by the rocker arms (such as the rocker arms shown by FIGS. 3-4). Each rocker arm may receive hydraulic fluid (e.g., engine oil) at a first, lower pressure via a first oil gallery. One or more of the cylinders may be adjusted from an activated mode in which gases (e.g., air) flow into the cylinders via movement of the intake valves and gases flow out of the cylinders via movement of the exhaust valves, to a deactivated mode in which the intake valves and exhaust valves do not move and gases do not flow into the cylinders or out of the cylinders. In order to adjust the cylinders from the activated mode to the deactivated mode (and vice versa), a group of the rocker arms coupled to the cylinders may additionally receive hydraulic fluid at a second, adjustable pressure via a second oil gallery (such as the first and second oil galleries shown by FIGS. 5-7). The oil pressure within the second oil gallery may be adjusted via actuation of one or more solenoid valves, such as the solenoid valves shown schematically by FIG. 2, in order to activate and/or deactivate one or more of the rocker arms coupled to the cylinders.

Figure 9:
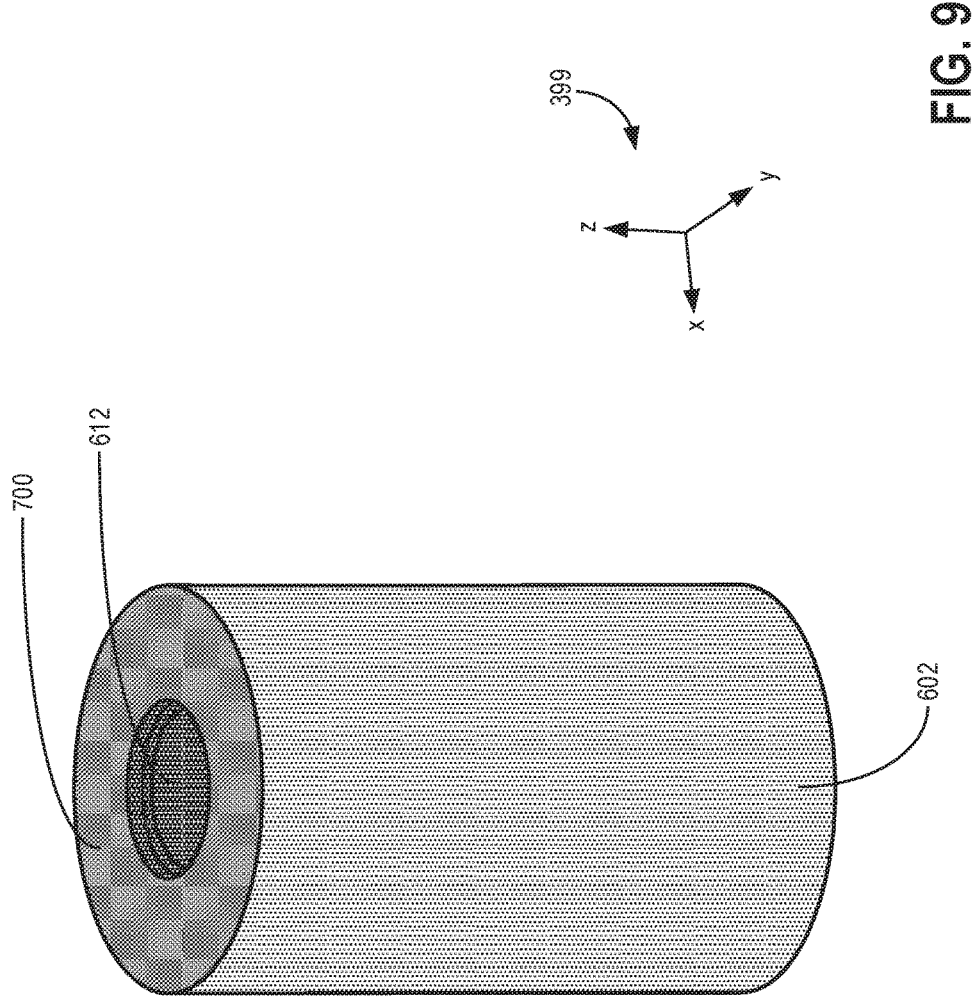
FIG. 9 shows the second plug shown by FIGS. 6-7 removed from the cylinder head.
Figure 10:
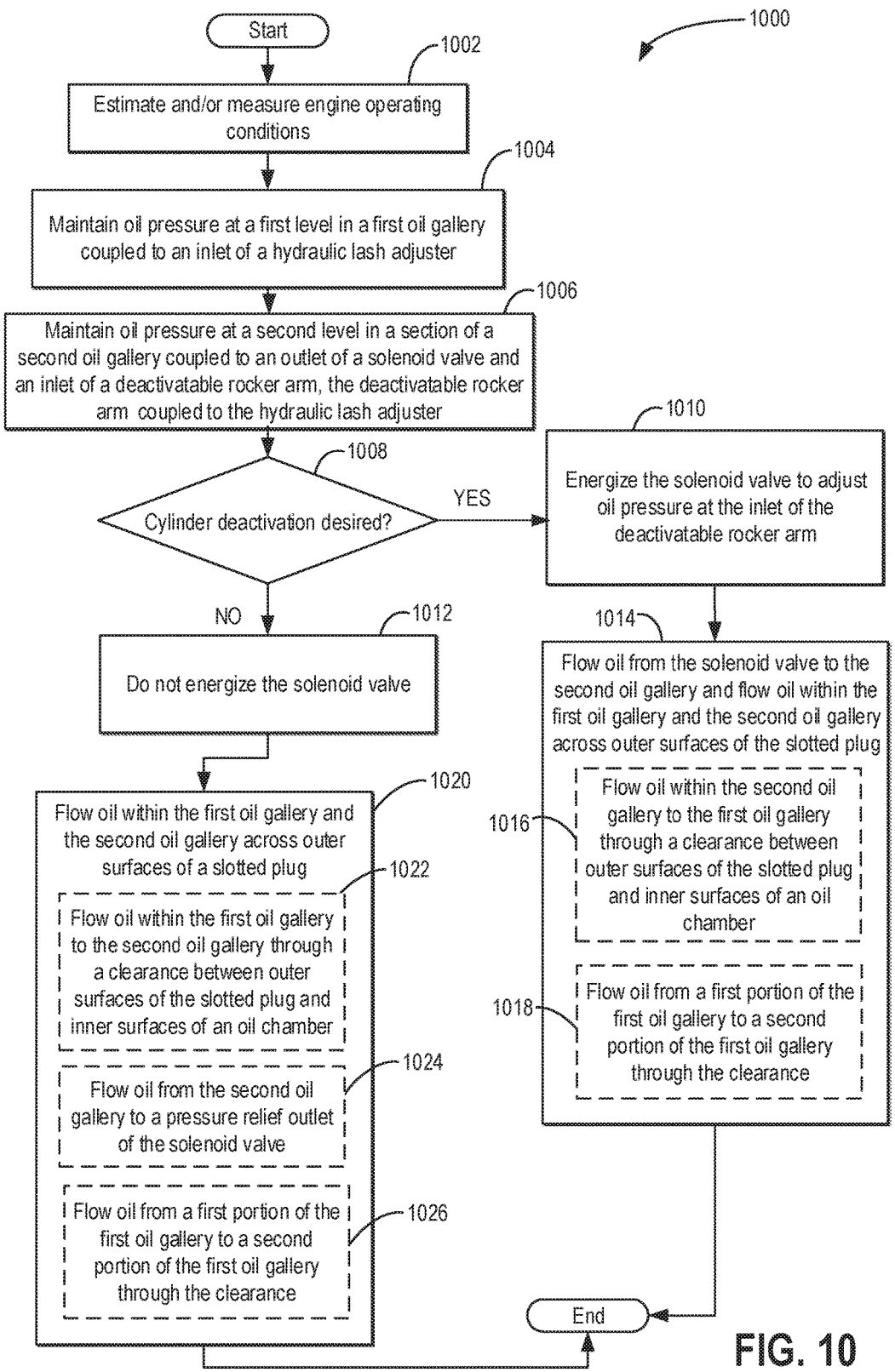
FIG. 10 illustrates a method of flowing oil through a cylinder head including a plurality of plugs.

A plurality of plugs (such as the plugs shown by FIGS. 8-9) are disposed within oil chambers coupling the first gallery to the second gallery. One or more of the plugs includes a slot to enable oil to flow from the solenoid valves to the second oil gallery. The plugs reduce a flow of oil within the second gallery directly between rocker arms coupled to different cylinders so that one or more of the cylinders may be activated and/or deactivated independently relative to each other cylinder. A smaller amount of oil may flow through a clearance between an outer surface of each plug and inner surfaces of the respective oil chambers in which the plugs are disposed (as shown by the method of FIG. 10). By configuring the plugs such that the smaller amount of oil may flow through the clearance, an amount of time to adjust the oil pressure within the second gallery may be reduced. In this way, an amount of time to adjust the rocker arms within the group of rocker arms from a deactivated mode to an activated mode (or vice versa) may be decreased.

Figure 1:
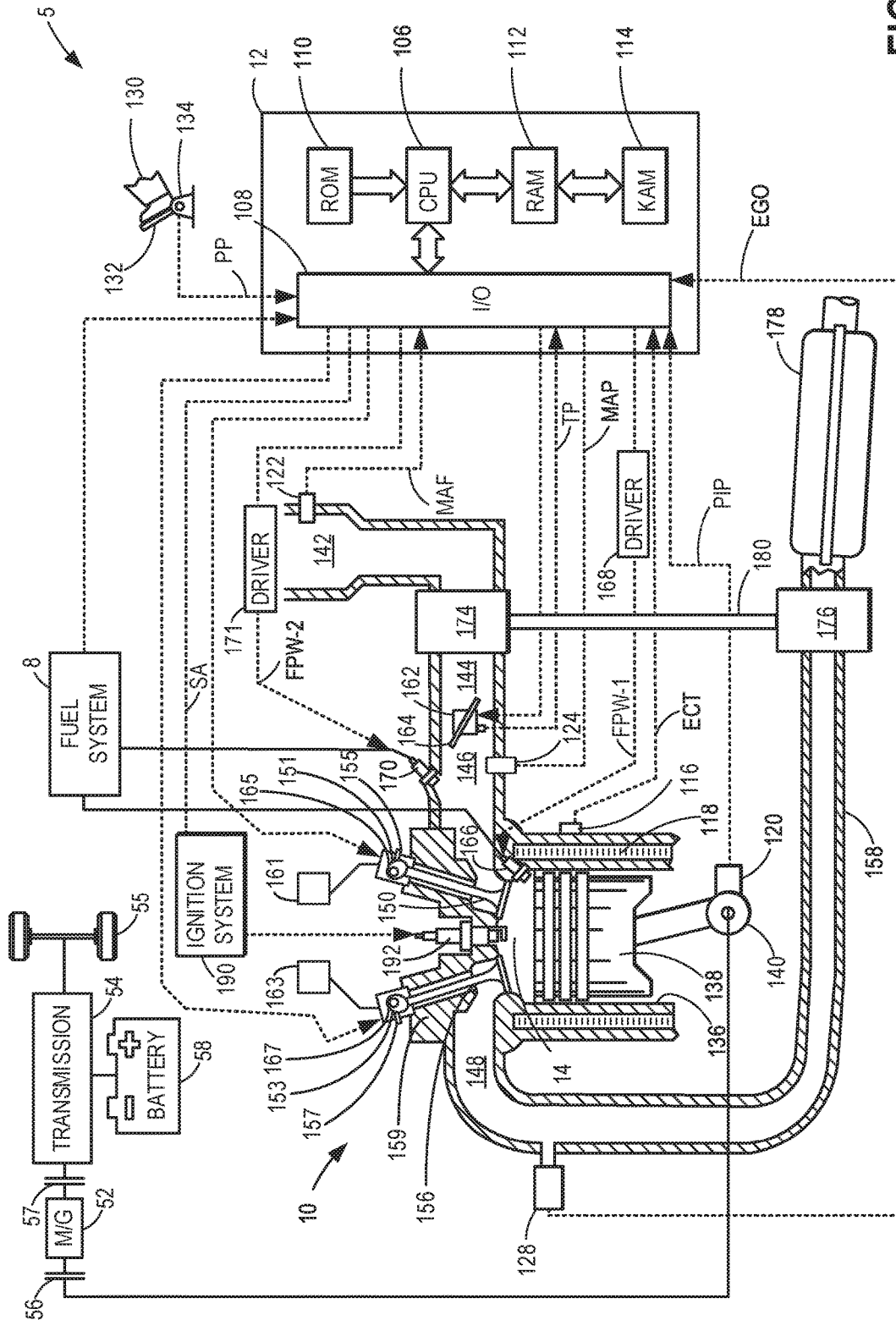
FIG. 1 shows a schematic diagram of an engine system including a plurality of intake valves and exhaust valves.

FIG. 1 depicts an example of a cylinder 14 (which may be referred to herein as a combustion chamber) of internal combustion engine 10 included within vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 of engine 10 may include cylinder walls 136 capped by cylinder head 159. The cylinder head 159 includes a plurality of passages formed by interior surfaces of the cylinder head 159 and configured to flow hydraulic fluid (e.g., engine oil) to various components of the engine 10 (e.g., deactivation assemblies of one or more intake and/or exhaust valves as described further below). The cylinder 14 includes a piston 138 positioned therein. Piston 138 may be coupled to crankshaft 140 so that reciprocating motion of the piston is translated into rotational motion of the crankshaft. Crankshaft 140 may be coupled to at least one drive wheel of the vehicle 5 via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake air passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine 10. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 includes one or more intake valves and one or more exhaust valves. For example, cylinder 14 is shown including at least one intake poppet valve 150 and at least one exhaust poppet valve 156 located at an upper region of cylinder 14 (e.g., disposed within cylinder head 159). In some examples, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams (e.g., intake cam 165 and exhaust cam 167, respectively) and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, one of the intake or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a shared valve actuator or actuation system, with the shared valve actuator configured to actuate both of the intake valve and exhaust valve.

The intake valve and exhaust valve may each be coupled to valve deactivation assemblies configured to adjust an operational mode of the valves in response to signals transmitted to the valve deactivation assemblies by the controller 12. Intake valve 150 is shown coupled to valve deactivation assembly 161 and exhaust valve 156 is shown coupled to valve deactivation assembly 163. In one example, the controller 12 may transmit electrical signals to the valve deactivation assembly 161 in order to adjust the operational mode of the intake valve 150 from an activated mode to a deactivated mode (or vice versa) and/or the controller 12 may transmit electrical signals to the valve deactivation assembly 163 in order to adjust the operational mode of the exhaust valve 156 from an activated mode to a deactivated mode (or vice versa).

Each of the valve deactivation assemblies (e.g., valve deactivation assembly 161 and valve deactivation assembly 163) may include a hydraulic lash adjuster and a rocker arm fluidly coupled to a solenoid valve (e.g., similar to the example described below with reference to FIG. 2). In the example described above, transmitting electrical signals to the valve deactivation assemblies via the controller may include transmitting electrical signals to the solenoid valves of the valve deactivation assemblies in order to adjust the solenoid valves to a fully closed position, a fully opened position, or a plurality of positions between the fully closed position and the fully opened position. In an example operation of the intake valve 150, the intake valve 150 may operate in the activated mode during conditions in which a solenoid valve of valve deactivation assembly 161 is in the fully closed position, and the intake valve 150 may operate in the deactivated mode during conditions in which the solenoid valve is in the fully opened position or one of the plurality of positions between the fully closed position and the fully opened position. Although operation of the intake valve 150 is described herein as an example, the exhaust valve 156 may operate in a similar way (e.g., with the operational mode of the exhaust valve 156 being adjusted via the valve deactivation assembly 163). In some examples, moving the solenoid valves to an opened position may increase a pressure of oil at the hydraulic lash adjusters to operate the valves (e.g., intake valve 150 and exhaust valve 156) in the deactivated mode, and moving the solenoid valves to the closed position may not increase the pressure of oil at the hydraulic lash adjusters to operate the valves in the activated mode (as described in further detail below with reference to FIG. 2).

In the activated mode, the rocker arm coupled to the intake valve 150 is pressed into engagement with the cam 165 by the hydraulic lash adjuster so that a rotational motion of the cam 165 (e.g., rotational motion resulting from a rotation of a camshaft coupled to the cam 165 by the engine 10) is converted into a pivoting motion of the rocker arm, and the pivoting motion of the rocker arm is converted into a linear motion of the intake valve 150. The linear motion of the intake valve 150 enables intake air to flow through the intake air passage 146 and into the cylinder 14. For example, as the intake valve 150 is moved toward the cylinder 14 (e.g., towards an opened position), a flow of intake air around the intake valve 150 from the intake air passage 146 and into the cylinder 14 may be increased. As the intake valve 150 is moved away from the cylinder 14 (e.g., towards a closed position), the flow of intake air around the intake valve 150 from the intake air passage 146 and into the cylinder 14 may be decreased. In this way, movement of the intake valve 150 provides the cylinder 14 with intake air for combustion within the cylinder 14. Similarly, in the activated mode, movement of the exhaust valve 156 (e.g., via valve deactivation assembly 163) enables combusted fuel/air mixture to be exhausted from the cylinder 14 into exhaust passage 148.

However, in the deactivated mode, the rocker arm coupled to the intake valve 150 is not pressed into engagement with the cam 165 by the hydraulic lash adjuster. As a result, the rotational motion of the cam 165 is not converted into the pivoting motion of the rocker arm, and the intake valve 150 does not move from the closed position toward the opened position. During conditions in which the intake valve 150 is in the deactivated mode, intake air does not flow into the cylinder 14 (e.g., via the intake passage 146). Similarly, during conditions in which the exhaust valve 156 is in the deactivated mode, combustion gases are not exhausted from the cylinder 14 (e.g., via the exhaust passage 148). By deactivating both of the intake valve 150 and the exhaust valve 156, combustion of fuel/air within the cylinder 14 may be prevented for a duration (e.g., one or more complete cycles of the engine 10). Additionally, during conditions in which both of the intake valve 150 and the exhaust valve 156 are in the deactivated mode, the controller 12 may reduce an amount of fuel provided to the cylinder 14 (e.g., via electrical signals transmitted to fuel injector 166 and/or fuel injector 170) and/or may reduce an amount of spark produced by a spark plug 192 disposed within the cylinder 14.

Although operation of the cylinder 14 is adjusted via the valve deactivation assemblies 161 and 163 as described above, in some examples (such as the example shown by FIG. 2 and described below) operation of one or more cylinders of the engine 10 may not be adjusted by valve deactivation assemblies. For example, the engine 10 may include four cylinders (e.g., cylinder 14), with operation of a first pair of the cylinders being adjustable valve deactivation assemblies and operation of a second pair of cylinders not being adjustable via valve deactivation assemblies.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and/or fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle (e.g., combustion cycle) of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

The controller 12 receives signals from the various sensors of FIG. 1 and employs the various actuators of FIG. 1 to adjust engine operation based on the received signals and instructions stored on a memory of the controller. For example, adjusting the intake valve 150 from the activated mode to the deactivated mode may include adjusting an actuator of the intake valve 150 to adjust an amount of movement of the intake valve 150 relative to the cylinder head 159. For example (as described above), the controller 12 may transmit electrical signals to a solenoid valve of the valve deactivation assembly 161 (with the valve deactivation assembly 161 coupled to the intake valve 150) in order to move the solenoid valve from the closed position to an opened position. Moving the solenoid valve to the opened position may increase a pressure of hydraulic fluid (e.g., oil) at the hydraulic lash adjuster of the valve deactivation assembly 161, with the hydraulic lash adjuster being coupled to the rocker arm of the valve deactivation assembly 161. The increased pressure results in the rocker arm being disengaged from the intake valve 150, thereby adjusting the intake valve to the deactivated mode. Similarly, the controller 12 may transmit electrical signals to the solenoid valve in order to move the solenoid valve to an opened position and thereby adjust the intake valve to the activated mode.

As described above, FIG. 1 shows only one cylinder of a multi-cylinder engine. As such, each cylinder may similarly include its own set of intake/exhaust valves, hydraulic lash adjusters, rocker arms, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches are engaged. In the depicted example, a first clutch 56 is provided between crankshaft 140 and electric machine 52, and a second clutch 57 is provided between electric machine 52 and transmission 54. Controller 12 may send a signal to an actuator of each clutch (e.g., first clutch 56 and/or second clutch 57) to engage or disengage the clutches, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Figure 2:
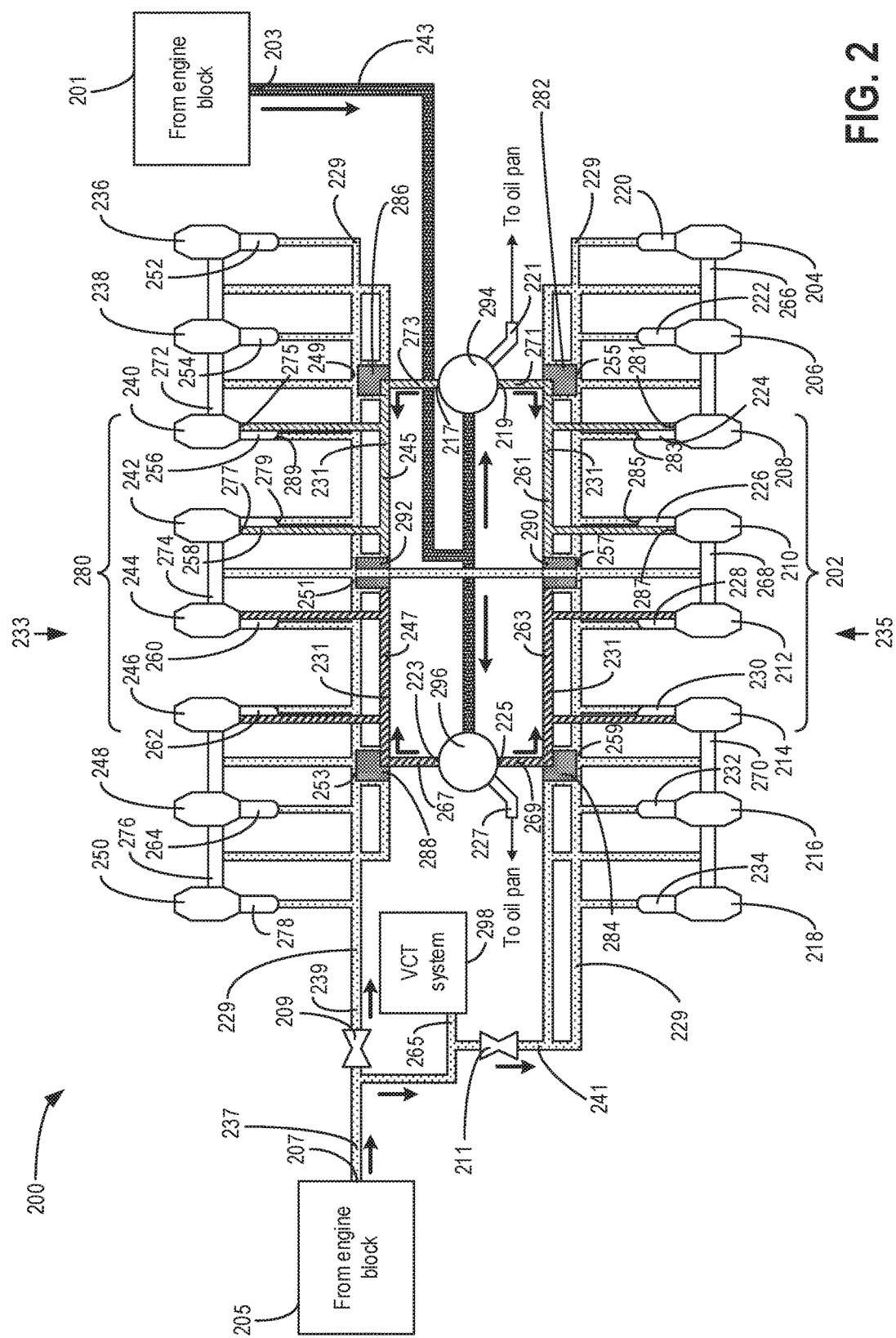
FIG. 2 shows a schematic diagram of a plurality of oil flow passages of a cylinder valve actuation system of an engine system, the plurality of oil flow passages fluidly coupled to a plurality of slotted plugs.

FIG. 2 schematically shows an engine oil system 200 (which may also be referred to herein as an oil flow system and/or cylinder valve actuation system) of a cylinder head, such as the cylinder head 159 described above with reference to FIG. 1 or the cylinder head described below with reference to FIGS. 3-4. The oil system 200 includes a plurality of oil passages formed within an interior of the cylinder head and configured to deliver oil to engine components coupled to and/or formed by the cylinder head. For example, the oil system 200 includes a first oil gallery 229 and a second oil gallery 231, with each of the first oil gallery 229 and second oil gallery 231 including different pluralities of oil passages (e.g., with oil passages of the first oil gallery 229 indicated with a lighter shading and oil passages of the second oil gallery 231 indicated with a darker shading).

The first oil gallery 229 and second oil gallery 231 are coupled to a plurality of hydraulic lash adjusters (HLAs), with each HLA configured to reduce an amount of clearance between a rocker arm of the engine and a corresponding cam lobe engaged with the rocker arm. Specifically, the first oil gallery 229 is coupled to intake HLAs 278, 264, 262, 260, 258, 256, 254, and 252, as well as exhaust HLAS 234, 232, 230, 228, 226, 224, 222, and 220. Intake HLAs 278, 264, 262, 260, 258, 256, 254, and 252 (positioned at intake side 233 of the cylinder head) are coupled to intake rocker arms 250, 248, 246, 244, 242, 240, 238, and 236 respectively, and exhaust HLAS 234, 232, 230, 228, 226, 224, 222, and 220 (positioned at exhaust side 235 of the cylinder head) are coupled to exhaust rocker arms 218, 216, 214, 212, 210, 208, 206, and 204 respectively. The intake rocker arms are configured to convert rotational motion of intake cams of the engine into linear motion of intake valves of the engine (e.g., intake cam 165 and intake valve 150 described above with reference to FIG. 1). The exhaust rocker arms are configured to convert rotational motion of exhaust cams of the engine into linear motion of exhaust valves of the engine (e.g., exhaust cam 167 and exhaust valve 156 described above with reference to FIG. 1).

Journals of the intake camshaft and exhaust camshaft of the engine are shown extending between the rocker arms and are positioned such that the rocker arms may engage with cams of the camshafts. For example, intake rocker arms 250, 248, and 246 may engage cams positioned along intake journal 276, intake rocker arms 244 and 242 may engage cams positioned along intake journal 274, and intake rocker arms 240, 238, and 236 may engage cams positioned along intake journal 272. Exhaust rocker arms 218, 216, and 214 may engage cams positioned along exhaust journal 270, exhaust rocker arms 212 and 210 may engage cams positioned along exhaust journal 268, and exhaust rocker arms 208, 206, and 204 may engage cams positioned along exhaust journal 266. Each rocker arm may engage corresponding cams positioned directly vertically above the rocker arms. For example, intake rocker arm 250 may engage an intake cam coupled to intake journal 276, with the intake cam being positioned directly vertically above the intake rocker arm 250 and aligned with the intake rocker arm 250 in a radial direction of the intake journal 276.

A switchable group 280 of the intake rocker arms and a switchable group 202 of the exhaust rocker arms are each additionally coupled to the second oil gallery 231 via their corresponding HLAs. Although the second oil gallery 231 is shown coupled to the corresponding HLAs of the switchable group 280 and switchable group 202 by FIG. 2, in alternate embodiments the second oil gallery 231 may instead be directly coupled to the rocker arms of the switchable group 280 (e.g., intake rocker arms 246, 244, 242, and 240) and the rocker arms of the switchable group 202 (e.g., exhaust rocker arms 214, 212, 210, and 208). Oil flowing from the first oil gallery 229 may be fluidly isolated from oil flowing from the second oil gallery 231 within the HLAs and/or rocker arms (e.g., oil from the first oil gallery 229 may not mix and/or converge with oil from the second oil gallery 231 within the HLAs and/or rocker arms). In some embodiments, each HLA may be formed together (e.g., molded together, welded, etc.) with its corresponding rocker arm as a single piece. In other embodiments (such as the embodiment shown by FIG. 2), each HLA and corresponding rocker arm may be separate pieces fluidly coupled to each other such that oil from the first oil gallery 229 and/or second oil gallery 231 may flow from the HLA to the corresponding rocker arm (or vice versa). The intake rocker arms of the switchable group 280 and the exhaust rocker arms of the switchable group 202 may adjust the valves of the engine (e.g., intake valves and exhaust valves, respectively) from an activated mode to a deactivated mode (and vice versa) in response to a pressure of oil at the rocker arms as described further below. For example, the intake rocker arms 240 and 242 and the exhaust rocker arms 208 and 210 may adjust valves coupled to a first cylinder of the engine from an activated mode to a deactivated mode (and vice versa), and the intake rocker arms 244 and 246 and the exhaust rocker arms 212 and 214 may adjust valves coupled to a second cylinder of the engine from an activated mode to a deactivated mode (and vice versa).

Oil flows into the first oil gallery 229 of the cylinder head from a first location of the engine block (as indicated at 205) via a first oil inlet 207. Specifically, oil flows through the first oil inlet 207 into a first oil passage 237 fluidly coupled with the first oil gallery 229 via a first restrictor 209. The first restrictor 209 may reduce a flow rate and/or oil pressure of oil flowing from the first oil inlet 207 through the first oil passage 237 into the first oil gallery 229. A first portion of oil flowing through the first restrictor 209 is directed into a first section 239 of the first oil gallery 229. The first section 239 of the first oil gallery 229 is positioned at the intake side 233 of the cylinder head and may be referred to herein as an intake-side section. A second portion of the oil flowing through the first restrictor 209 is directed toward a variable cam timing (VCT) system 298 (e.g., via oil passage 265) and toward a second section 241 of the first oil gallery 229. The second section 241 of the first oil gallery 229 is positioned at the exhaust side 235 of the cylinder head and may be referred to herein as an exhaust-side section of the first oil gallery 229. The oil directed toward the second section 241 of the first oil gallery 229 flows through a second restrictor 211. The second restrictor 211 may reduce a flow rate and/or oil pressure of oil flowing into the second section 241 of the first oil gallery 229 and/or may increase a flow rate of oil toward the VCT system 298.

Each HLA includes a first inlet fluidly coupled to the first oil gallery 229 and configured to receive oil flowing through the first oil gallery 229. For example, the intake HLAs 256 and 258 include first inlets 289 and 279 (respectively) coupled to the first oil gallery 229, and the exhaust HLAs 224 and 226 include first inlets 283 and 285 (respectively) coupled to the first oil gallery 229. A pressure of oil within the first oil gallery 229 may press the HLAs into engagement with their corresponding rocker arms in order to reduce an amount of clearance between each rocker arm and each corresponding valve (e.g., intake valve or exhaust valve) of the engine. However, the pressure of oil within the first oil gallery 229 does not adjust the rocker arms from the activated mode to the deactivated mode (or vice versa). For example, during conditions in which one or more of the rocker arms is in the deactivated mode (as described below), the oil pressure within the first oil gallery 229 does cause the deactivated rocker arms to press into engagement with the cams of the camshaft.

Oil flows into the second oil gallery 231 from a second, different location of the engine block (as indicated by 201) relative to the first location indicated by 205 and described above. The oil flows into the second oil gallery 231 via a second oil inlet 203 coupled to a second oil passage 243 and is directed toward a first solenoid valve 294 and a second solenoid valve 296. The first solenoid valve 294 and/or second solenoid valve 296 may be electrically actuated via electrical signals transmitted to the valves from a controller of the engine (e.g., controller 12 described above with reference to FIG. 1) in order to adjust an oil pressure within the second oil gallery 231. In one example, the controller may transmit an electrical signal to the first solenoid valve 294 in order to move the first solenoid valve 294 from a closed position to one of a plurality of opened positions (or vice versa), and/or the controller may transmit an electrical signal to the second solenoid valve 296 in order to move the second solenoid valve 296 from a closed position to one of a plurality of opened positions (or vice versa). The first solenoid valve 294 is coupled to a first section 245 and a second section 261 of the second oil gallery 231, and the second solenoid valve 296 is coupled to a third section 247 and a fourth section 263 of the second oil gallery 231. The first section 245 is directly coupled to the rocker arms 240 and 242, the second section 261 is directly coupled to the rocker arms 208 and 210, the third section 247 is directly coupled to the rocker arms 244 and 246, and the fourth section 263 is directly coupled to the rocker arms 212 and 214. The rocker arms 240, 242, 208, 210, 244, 246, 212, and 214 may be referred to herein as deactivatable rocker arms.

During conditions in which the first solenoid valve 294 is in an opened position, an oil pressure within the first section 245 and/or the second section 261 may be increased due to oil flowing from the engine block through second oil passage 243 and into the first section 245 and/or the second section 261. For example, oil within the second oil passage 243 may be at a higher pressure than oil within the first section 245 and/or second section 261 of the second oil gallery 231, and as the first solenoid valve 294 is moved from the closed position to an opened position, an amount of oil may flow into the first section 245 and/or the second section 261 from the second oil passage 243. In one example, during conditions in which the first solenoid valve 294 is in an opened positioned, oil may flow through the first solenoid valve 294 into both of the first section 245 (via an outlet 217 coupled to an oil passage 273, the oil passage 273 coupled to the first section 245) and the second section 261 (via an outlet 219 coupled to an oil passage 271, the oil passage 271 coupled to the second section 261). The oil may flow into the first section 245 and the second section 261 such that a pressure of oil within the first section 245 and a pressure of oil within the second section 261 are approximately a same amount of pressure.

In one example operation of the engine oil system 200, the first solenoid valve 294 is in the closed position such that oil does not flow through the first solenoid valve 294 into the first section 245 and/or the second section 261. A pressure of oil within the first section 245 is a same amount of pressure as a pressure of oil within the second section 261, with the oil pressure in the first section 245 and second section 261 being a first, lower oil pressure (e.g., a pressure within a range of 0.1 bar to 0.3 bar). The controller transmits an electrical signal to the first solenoid valve 294 in order to move the first solenoid valve 294 from the closed position to an opened position. As the first solenoid valve 294 moves to the opened position, oil flows through the first solenoid valve 294 from the second oil passage 243 into both of the first section 245 and the second section 261. The oil flowing into the first section 245 and second section 261 increases the pressure of oil within the first section 245 and second section 261 to a second, higher oil pressure (e.g., a pressure within a range of 2 bar to 4 bar).

Although the flow of oil through the first solenoid valve 294 to the first section 245 and/or second section 261 is described above as an example, the second solenoid valve 296 may operate in a similar way in relation to the third section 247 and fourth section 263. For example, moving the second solenoid valve 296 from the closed position to an opened position (e.g., via electrical signals transmitted to the second solenoid valve 296 by the controller) may increase an oil pressure within the third section 247 (via an outlet 223 coupled to an oil passage 267, the oil passage 267 coupled to the third section 247) and/or the fourth section 263 (via an outlet 225 coupled to an oil passage 269, the oil passage 269 coupled to the fourth section 263).

Each of the rocker arms of the switchable group 280 and the rocker arms of the switchable group 202 may be adjusted between the activated mode and deactivated mode via adjustment of the oil pressure within the corresponding sections of the second oil gallery 231. Adjusting the rocker arms between the activated mode and deactivated mode may adjust one or more corresponding cylinders of the engine from an activated mode to a deactivated mode (and vice versa). As one example, moving the first solenoid valve 294 to an opened position in order to increase a pressure of oil within the first section 245 and the second section 261 of the second oil gallery 231 increases the pressure of oil at an inlet 275 of rocker arm 240, increases the oil pressure at an inlet 277 of rocker arm 242, increases the oil pressure at an inlet 281 of rocker arm 208, and increases the oil pressure at an inlet 287 of rocker arm 210.

Increasing the oil pressure at the inlets of the rocker arms as described above may switch the rocker arms from the activated mode (e.g., a mode in which an inner section of each rocker arm is fixedly coupled to an outer section to transform a rotational motion of cams of the engine into a linear motion of valves of the engine) to a deactivated mode (e.g., a mode in which the inner sections of the rocker arms may pivot independently of the outer sections so that the rotational motion of the cams is not transformed into linear motion of the valves). Adjusting the intake rocker arms 240 and 242 and the exhaust rocker arms 208 and 210 to the deactivated mode by increasing the oil pressure within the first section 245 and second section 261 results in the intake rocker arms 240 and 242 not moving their corresponding coupled intake valves of the engine (e.g., via disengagement of the inner section of each rocker arm from the outer section) and the exhaust rocker arms 208 and 210 not moving their corresponding coupled exhaust valves of the engine. Deactivating the rocker arms adjusts the intake valves and exhaust valves to the deactivated mode such that the intake valves and exhaust valves remain in the closed position and do not open in response to the rotational motion of the camshaft of the engine. By maintaining the intake valves and exhaust valves in the closed position, the cylinder coupled to the intake valves and exhaust valves is deactivated (e.g., fuel and air is not combusted within the cylinder).

In one example, the engine may include four cylinders, with the intake rocker arms 242 and 240 configured to engage intake valves of a first cylinder, exhaust rocker arms 208 and 210 configured to engage exhaust valves of the first cylinder, intake rocker arms 244 and 246 configured to engage intake valves of a second cylinder, and exhaust rocker arms 212 and 214 configured to engage exhaust valves of the second cylinder. In the example described herein, the four cylinders may be positioned in an inline arrangement (e.g., with each cylinder positioned along a same axis), with the first cylinder and second cylinder described above being positioned adjacent to each other at a center of the inline arrangement and flanked by the other two cylinders. By opening the first solenoid valve 294 as described above, the intake valves and exhaust valves of the first cylinder may be deactivated, and by opening the second solenoid valve 296, the intake valves and exhaust valves of the second cylinder may be deactivated (e.g., by increasing the pressure of oil within the third section 247 and the fourth section 263 of the second oil gallery 231, similar to the example described above with reference to the first section 245 and second section 261).

In order to adjust the first cylinder from the deactivated mode to the activated mode (e.g., to the mode in which the intake valves and exhaust valves of the first cylinder are moved by their corresponding rocker arms and fuel/air is combusted within the first cylinder), the first solenoid valve 294 may be moved into a ventilation position in which oil flows from the first section 245 and/or second section 261 to an oil pan of the engine (with the oil pan fluidly coupled to a drain core of the cylinder head) via a ventilation passage 221 coupled to the first solenoid valve 294. Similarly, in order to adjust the second cylinder from the deactivated mode to the activated mode, the second solenoid valve 296 may be moved into a ventilation position in which oil flows from the third section 247 and/or fourth section 263 out to the oil pan of the engine via ventilation passage 227 coupled to the second solenoid valve 296. In other examples, the first solenoid valve 294 may be fluidly coupled to a pressure relief valve during conditions in which the first solenoid valve 294 is not energized, and the pressure relief valve may be configured to automatically (e.g., passively) flow oil to the ventilation passage 221 while an oil pressure at the pressure relief valve exceeds a threshold pressure (e.g., 0.1 bar). By flowing oil out of the ventilation passage 221 (e.g., directly via the first solenoid valve 294, or via the pressure relief valve described above), the pressure of oil within the first section 245 and/or second section 261 may be decreased.

For example, during conditions in which the first solenoid 294 is energized, an oil pressure within the first section 245 and the second section 261 may be within a first range (e.g., 2 bar to 4 bar). The first solenoid 294 may then be de-energized, with the oil pressure within the first section 245 and the second section 261 adjusting from the first range to a second range (e.g., 0.1 bar to 0.3 bar) by flowing oil through the pressure relief valve. Additionally, the oil pressure is adjusted from the first range to the second range by metering oil flow through clearances formed between a plurality of plugs and a plurality of oil chambers, as described below. The oil pressure may be retained in the second range by the pressure relief valve (e.g., by flowing oil through the pressure relief valve) during conditions in which the first solenoid 294 is not energized. Adjusting the oil pressure from the first range to the second range adjusts the intake rocker arms 240 and 242 and the exhaust rocker arms 208 and 210 from the deactivated mode to the activated mode in order to adjust the first cylinder from the deactivated mode to the activated mode. Similarly, the second solenoid valve 296 may be coupled to a second pressure relief valve in a similar way (e.g., similar to first solenoid valve 294 coupled to the pressure relief valve described above) in order to adjust a flow of oil through the ventilation passage 227 and the oil pressure within the third section 247 and fourth section 263. For example, adjusting the second solenoid valve 296 from an energized state to a de-energized state may decrease the oil pressure in the third section 247 and fourth section 263 from the first range to the second range, with the intake rocker arms 244 and 246 and the exhaust rocker arms 212 and 214 being adjusted from the deactivated mode to the activated mode in order to adjust the second cylinder to the activated mode.

The first oil gallery 229 and second oil gallery 231 are fluidly coupled with each other via a plurality of oil chambers including plugs disposed therein. The first oil gallery 229 and second oil gallery 231 are coupled to each other at the intake side 233 of the cylinder head by a first plurality of oil chambers, and the first oil gallery 229 and second oil gallery 231 are coupled to each other at the exhaust side 235 of the cylinder head by a second plurality of oil chambers. In the example shown by FIG. 2, the first plurality of oil chambers and the second plurality of oil chambers each include three oil chambers. Specifically, the first plurality of oil chambers at the intake side 233 includes a first oil chamber 249, a second oil chamber 251, and a third oil chamber 253, and the second plurality of oil chambers at the exhaust side 235 includes a fourth oil chamber 255, a fifth oil chamber 257, and a sixth oil chamber 259. In alternate embodiments (e.g., embodiments including a different number of rocker arms, HLAs, etc. relative to the example shown by FIG. 2), the first plurality of oil chambers and second plurality of oil chambers may each include a different number of oil chambers (e.g., two, four, five, etc.).

The first oil chamber 249 includes a first plug 286 disposed therein, the second oil chamber 251 includes a second plug 292 disposed therein, and the third oil chamber 253 includes a third plug 288 disposed therein. The first plug 286 includes a slot shaped to enable oil to flow from the first solenoid valve 294 through the first plug 286 and into the first section 245 of the second oil gallery 231 (e.g., the section of the second oil gallery 231 directly coupled to the intake HLAs 256 and 258). The third plug 288 includes a slot shaped to enable oil to flow from the second solenoid valve 296 through the third plug 288 and into the third section 247 of the second oil gallery 231 (e.g., the section of the second oil gallery 231 directly coupled to the intake rocker arms 240 and 242). The second plug 292 is shaped to reduce an amount of oil flowing directly from the first section 245 to the third section 247 (and vice versa), as described further below.

The fourth oil chamber 255 includes a fourth plug 282 disposed therein, the fifth oil chamber 257 includes a fifth plug 290 disposed therein, and the sixth oil chamber 259 includes a sixth plug 284 disposed therein. The fourth plug 282 includes a slot shaped to enable oil to flow from the first solenoid valve 294 through the fourth plug 282 and into the second section 261 of the second oil gallery 231 (e.g., the section of the second oil gallery 231 directly coupled to the exhaust rocker arms 208 and 210). The sixth plug 284 includes a slot shaped to enable oil to flow from the second solenoid valve 296 through the sixth plug 284 and into the fourth section 263 of the second oil gallery 231 (e.g., the section of the second oil gallery 231 directly coupled to the exhaust rocker arms 212 and 214). The fifth plug 290 is shaped to reduce an amount of oil flowing directly from the second section 261 to the fourth section 263 (and vice versa), as described below.

Figure 3:
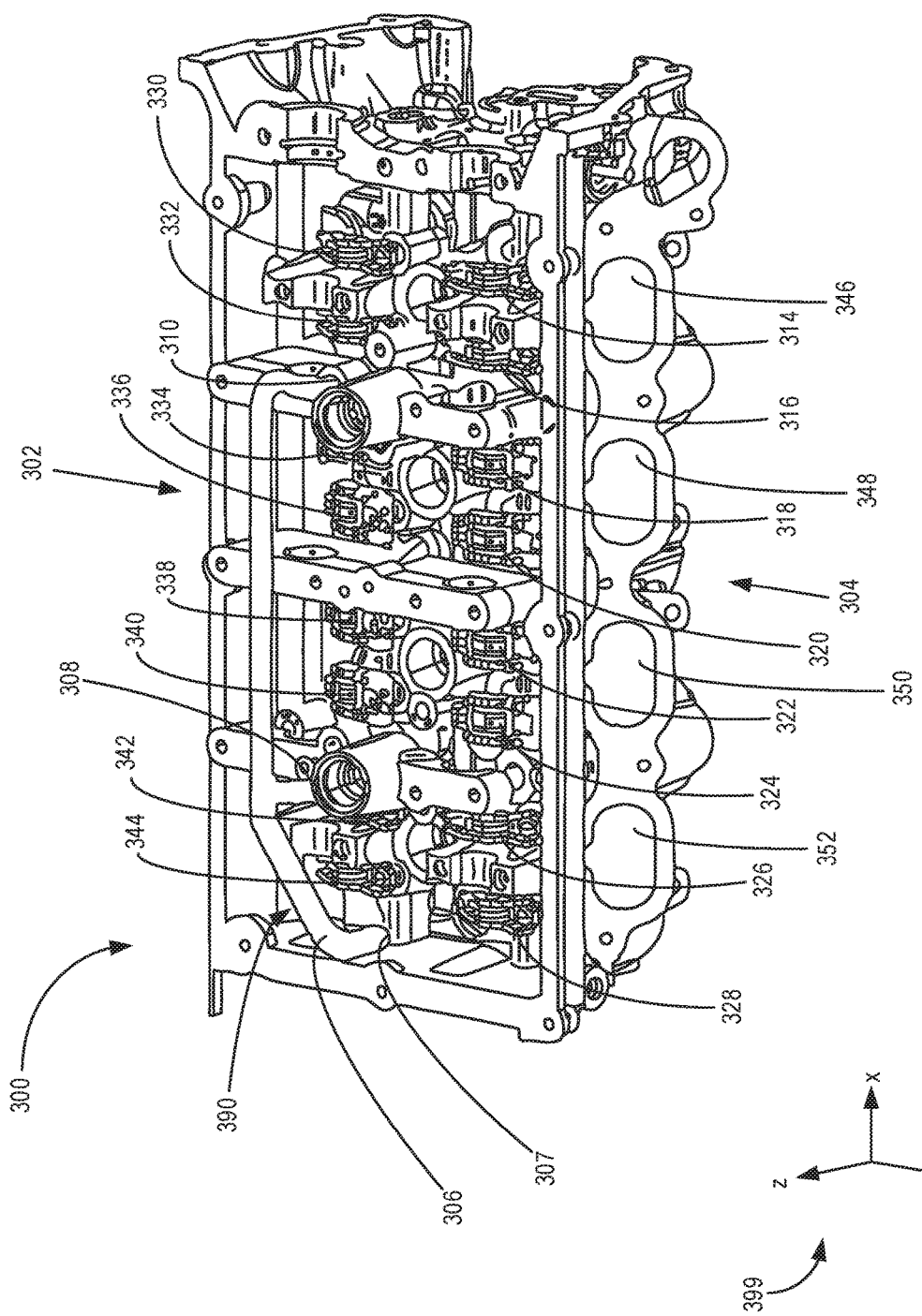
FIG. 3 shows a first perspective view of a cylinder head of an engine system.
Figure 4:
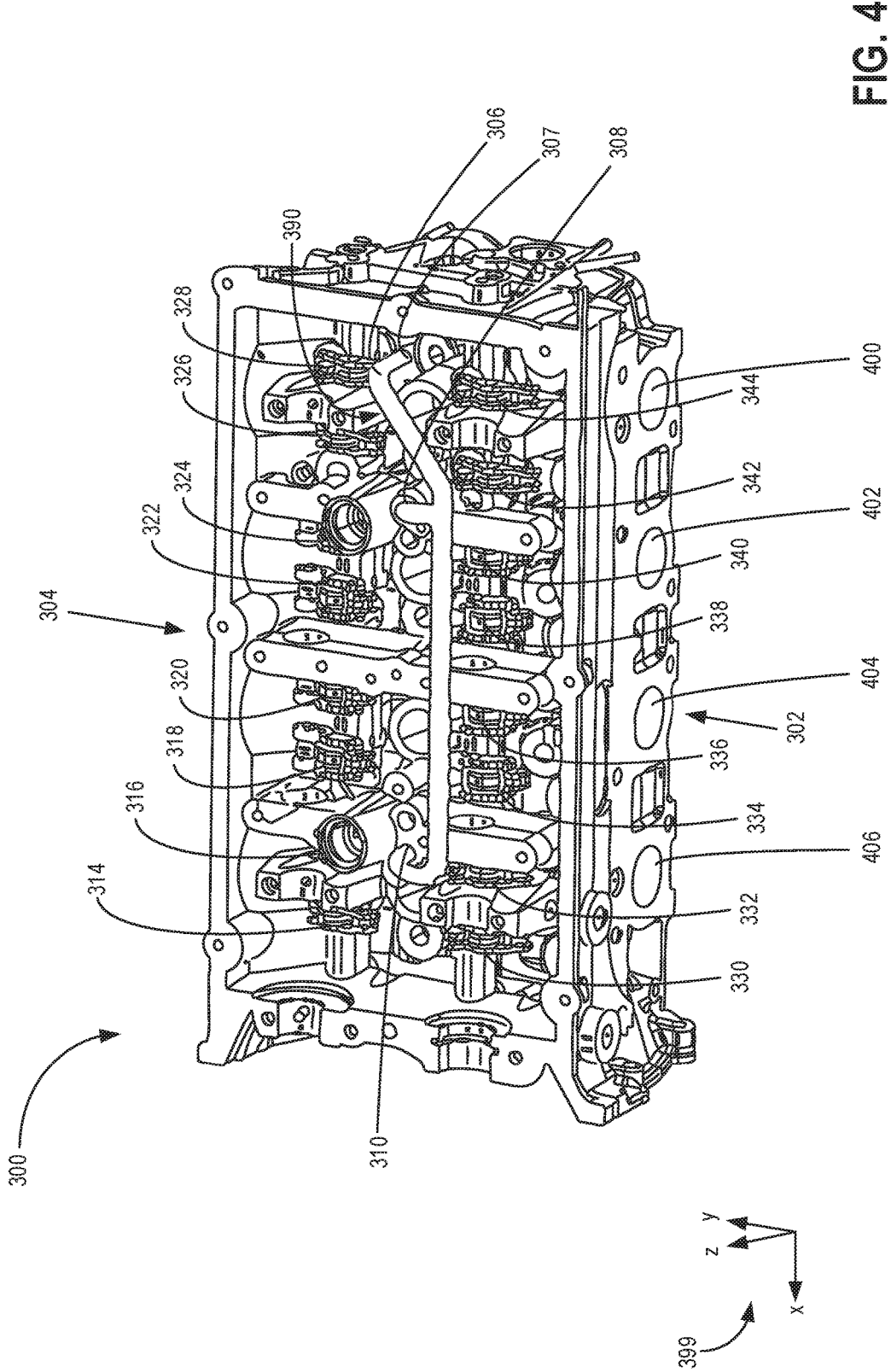
FIG. 4 shows a second perspective view of the cylinder head of FIG. 3.

FIGS. 3-4 each show different perspective views of a cylinder head 300 of an engine (e.g., similar to cylinder head 159 and engine 10 shown by FIG. 1 and described above). The cylinder head 300 receives engine oil from an engine block of the engine (e.g., a lower portion of the engine positioned vertically below the cylinder head 159) via an oil passage 306 coupled to an oil inlet 307 (similar to the second oil passage 243 coupled to the second oil inlet 203 shown by FIG. 2). The engine oil flowing through the oil inlet 307 is directed through the oil passage 306 toward a first oil outlet 308 and a second oil outlet 310, with the first oil outlet 308 coupled to a first solenoid valve (similar to the first solenoid valve 294 shown by FIG. 2 and described above) and the second oil outlet 310 coupled to a second solenoid valve (similar to the second solenoid valve 296 shown by FIG. 2 and described above). References axes 399 are included by each of FIGS. 3-9 for comparison of the views shown.

A first plurality of rocker arms are coupled to the cylinder head 300 at an intake side 302 of the cylinder head 300 and a second plurality of rocker arms are coupled to the cylinder head 300 at an exhaust side 304 of the cylinder head 300 (e.g., similar to the intake side 233 and exhaust side 235, respectively, described above with reference to FIG. 2). Specifically, intake side 302 includes intake rocker arms 330, 332, 334, 336, 338, 340, 342, and 344 (e.g., similar to rocker arms 236, 238, 240, 242, 244, 246, 248, and 250, respectively, described above with reference to FIG. 2), and exhaust side 304 includes exhaust rocker arms 314, 316, 318, 320, 322, 324, 326, and 328 (e.g., similar to rocker arms 204, 206, 208, 210, 212, 214, 216, and 218, respectively, described above with reference to FIG. 2). Each of the intake rocker arms and exhaust rocker arms may be coupled to separate hydraulic lash adjusters (not shown) similar to those described above with reference to FIG. 2 (e.g., rocker arms 236, 238, 240, 242, 244, 246, 248, and 250 coupled to HLAs 252, 254, 256, 258, 260, 262, 264, and 278, respectively, and rocker arms 204, 206, 208, 210, 212, 214, 216, and 218 coupled to HLAs 220, 222, 224, 226, 228, 230, 232, and 234, respectively).

The cylinder head 300 is configured to couple to an engine having four cylinders and includes a first intake port 400, second intake port 402, third intake port 404, and fourth intake port 406, as well as a first exhaust port 346, second exhaust port 348, third exhaust port 350, and fourth exhaust port 352. In alternate embodiments, the cylinder head may be configured to couple to an engine having a different number of cylinders and/or may include a different number of intake ports and/or exhaust ports.

Figure 5:
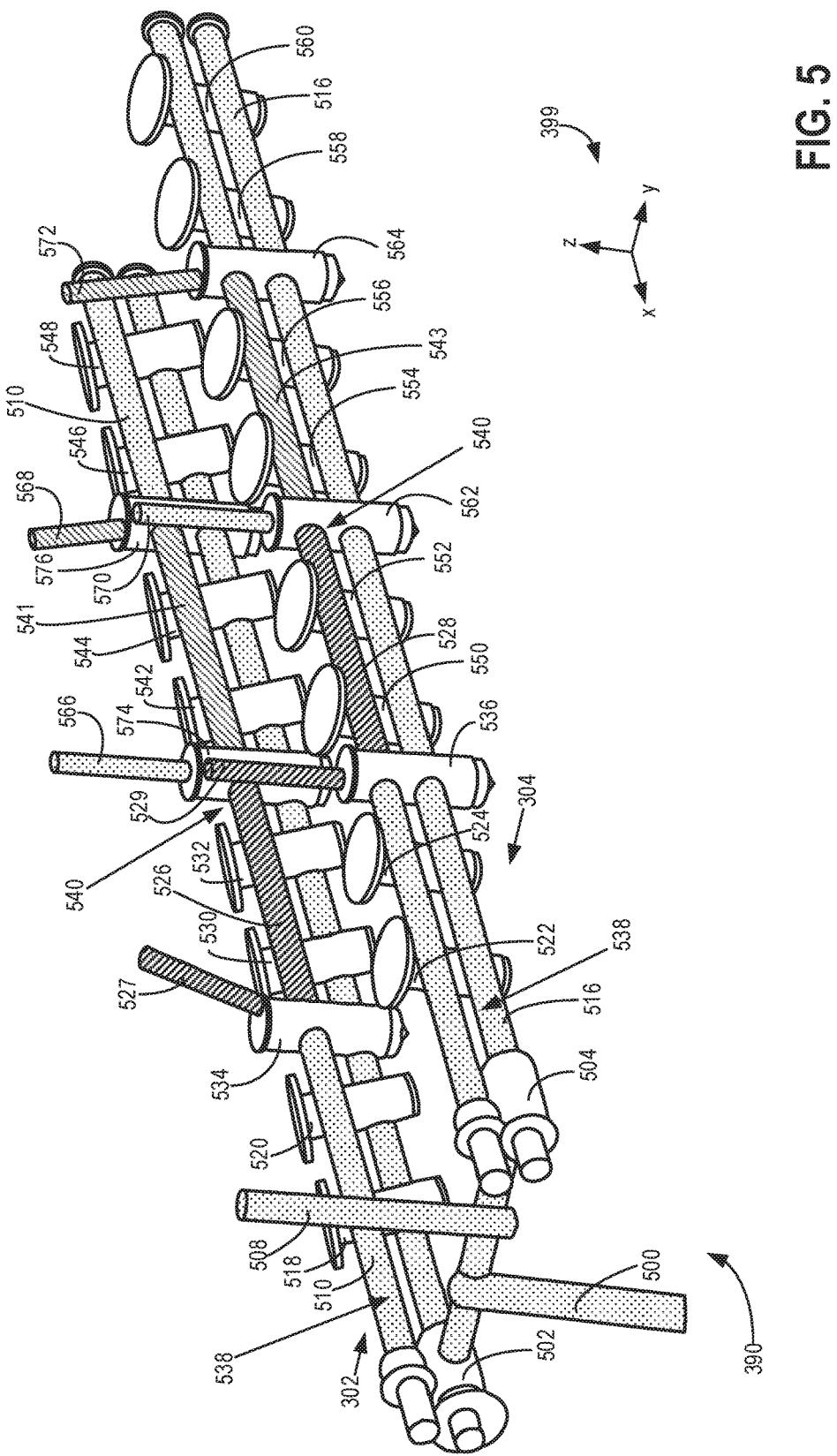
FIG. 5 shows a perspective view of oil passages formed within an interior of the cylinder head of FIGS. 3-4.

FIG. 5 shows a perspective view of an engine oil system 390 (which may also be referred to herein as an oil flow system and/or cylinder valve actuation system) positioned within an interior of the cylinder head 300 described above with reference to FIGS. 3-4. Some components of the cylinder head 300 (e.g., rocker arms, intake ports and exhaust ports, etc.) are not shown by FIG. 5 for illustrative purposes.

The engine oil system 390 includes a first oil gallery 538 and a second oil gallery 540 (similar to the first oil gallery 229 and second oil gallery 231 described above with reference to FIG. 2). The first oil gallery 538 and second oil gallery 540 each include a plurality of oil passages configured to direct engine oil to components of the cylinder head 300 (e.g., the rocker arms described above with reference to FIGS. 3-4). For example, the first oil gallery 538 includes a first plurality of passages forming a first section 510 of the first oil gallery 538 and a second plurality of passages forming a second section 516 of the first oil gallery 538 (similar to the first section 239 and second section 241 of the first oil gallery 229 shown by FIG. 2 and described above), with the first section 510 positioned at the intake side 302 and the second section 516 positioned at the exhaust side 304. The second oil gallery 540 includes a first section 541 positioned at the intake side 302, a second section 543 positioned at the exhaust side 304 and opposite to the first section 541, a third section 526 positioned at the intake side 302 and adjacent to the first section 541, and a fourth section 528 positioned at the exhaust side 304, opposite to the third section 526 and adjacent to the second section 543 (similar to the first section 245, second section 261, third section 247, and fourth section 263 shown by FIG. 2 and described above).

Oil (e.g., engine oil) flows into the first oil gallery 538 via a first oil passage 500 (similar to the first oil passage 237 shown by FIG. 2 and described above). A first portion of the oil flows from the first oil passage 500 through a first restrictor 502 (similar to the first restrictor 209 of FIG. 2) and into the first section 510 of the first oil gallery 538, and a second portion of the oil flows from the first oil passage 500 through a second restrictor 504 (similar to the second restrictor 211 of FIG. 2) and into the second section 516 of the first oil gallery 538. A third portion of the oil may flow from the first oil passage 500 and into a VCT oil passage 508 (similar to the oil passage 265 of FIG. 2) fluidly coupled to a variable cam timing system (similar to the VCT system 298 of FIG. 2). In one example, the first oil passage 500 is fluidly coupled to the engine block at a first location similar to the first location 205 shown by FIG. 2 and described above.

The first section 541 and second section 543 of the second oil gallery 540 are fluidly coupled to a first solenoid valve (similar to the first solenoid valve 294 of FIG. 2) via a first group of oil passages (e.g., oil passage 568 fluidly coupled to the first section 541 and oil passage 572 fluidly coupled to the second section 543, similar to the oil passages 271 and 273 shown by FIG. 2 and described above). The third section 526 and fourth section 528 of the second oil gallery 540 are fluidly coupled to a second solenoid valve (similar to the second solenoid valve 296 of FIG. 2) via a second group of oil passages (e.g., oil passage 527 fluidly coupled to the third section 526 and oil passage 529 fluidly coupled to the fourth section 528, similar to the oil passages 267 and 269 shown by FIG. 2 and described above).

A position of the rocker arms and HLAs relative to the oil galleries of the engine oil system 390 are indicated by FIG. 5. In particular, the intake rocker arms 344, 342, 340, 338, 336, 334, 332, and 330 (and their corresponding coupled HLAs) are positioned at locations 518, 520, 530, 532, 542, 544, 546, and 548 (respectively), and the exhaust rocker arms 328, 326, 324, 322, 320, 318, 316, and 314 (and their corresponding coupled HLAs) are positioned at locations 522, 524, 550, 552, 554, 556, 558, and 560.

The engine oil system 390 includes a plurality of oil chambers formed by both the first oil gallery 538 and the second oil gallery 540. Specifically, FIG. 5 shows a first oil chamber 576, a second oil chamber 574, a third oil chamber 534, a fourth oil chamber 564, a fifth oil chamber 562, and a sixth oil chamber 536 (similar to the first oil chamber 249, second oil chamber 251, third oil chamber 253, fourth oil chamber 255, fifth oil chamber 257, and sixth oil chamber 259, respectively, shown by FIG. 2 and described above). The second oil chamber 574 is fluidly coupled to the fifth oil chamber 562 (e.g., oil passage 566 is coupled to oil passage 570) similar to the example shown by FIG. 2. Each oil chamber is configured to house one of a plurality of plugs, as described in further detail below with reference to FIGS. 6-10.

Figure 6:
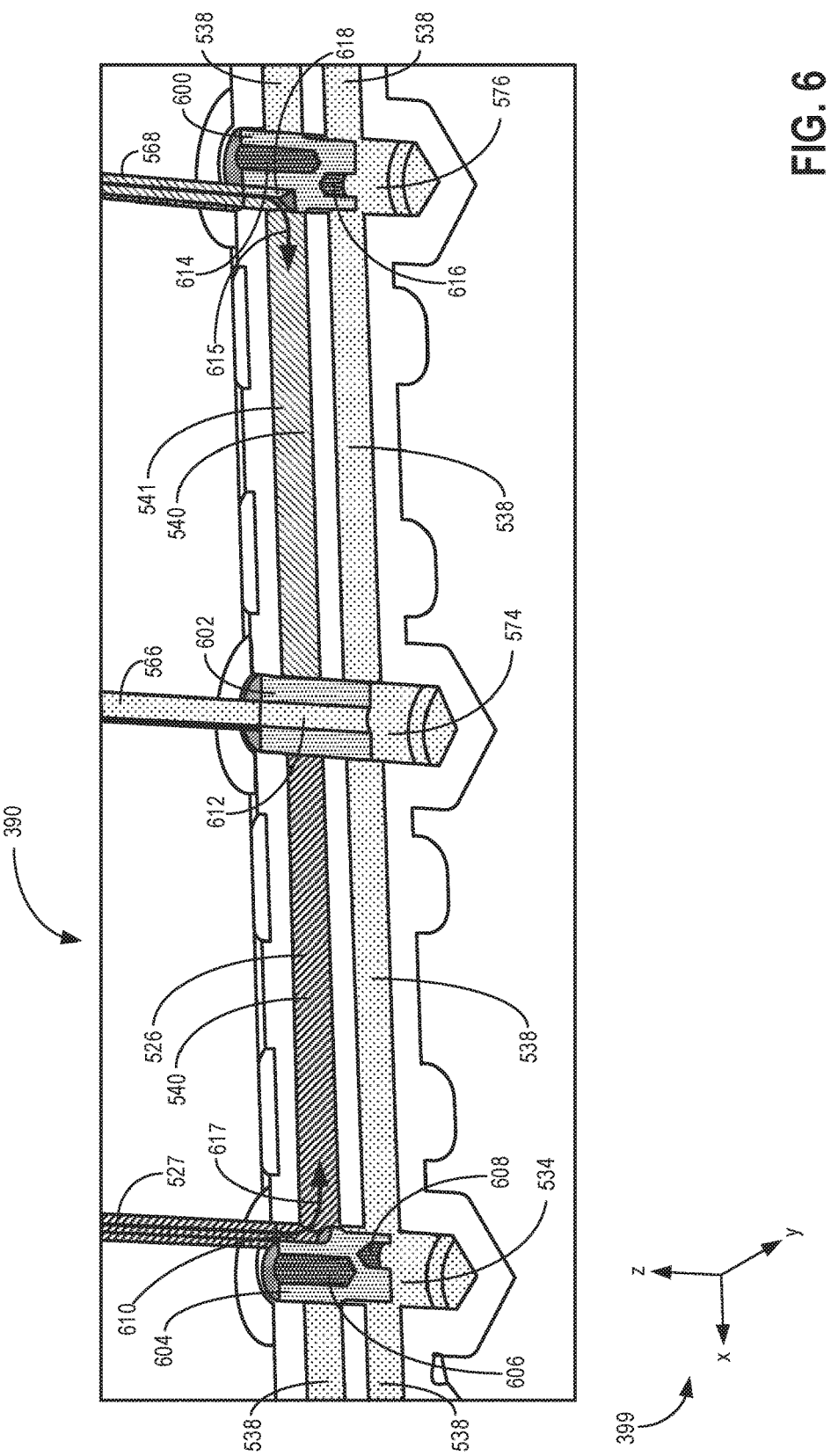
FIG. 6 shows a cross-sectional view of a portion of the cylinder head shown by FIGS. 3-4 including the oil passages shown by FIG. 5 and a first plug, a second plug, and a third plug disposed within the oil passages.

FIG. 6 shows a cross-sectional view of a portion of the engine oil system 390 shown by FIGS. 3-5. Specifically, FIG. 6 shows a first plug 600 housed within the first oil chamber 576, a second plug 602 housed within the second oil chamber 574, and a third plug 604 housed within the third oil chamber 534. The first plug 600, second plug 602, and third plug 604 are each shaped to direct a flow of oil within and/or between the first oil gallery 538 and the second oil gallery 540. For example, the third plug 604 includes a slot 610 (e.g., a recess) shaped such that oil may flow from the oil passage 527 through the slot 610 and into the third section 526 of the second oil gallery 540 (e.g., along flow path 617). The first plug 600 similarly includes a slot 618 shaped such that oil may flow from the oil passage 568 through the slot 618 and into the first section 541 of the second oil gallery 540 (e.g., along flow path 615). However, the second plug 602 does not include a slot similar to the slot 610 of the third plug 604 or the slot 618 of the first plug 600. The second plug 602 is positioned within the second oil chamber 574 and is shaped such that an amount of oil flowing directly from the first section 541 to the third section 526 (or vice versa) via the second oil chamber 574 is reduced. In some examples, the second plug 602 may include a section (e.g., tapered section) having a reduced diameter such that a clearance is formed between outer surfaces of the second plug 602 and inner surfaces of the second oil chamber 574, and oil may flow at a reduced rate between the first oil gallery 538 and second oil gallery 540 through the clearance (e.g., reduced relative to a flow rate of oil through passages of the first oil gallery 538 and/or second oil gallery 540). The first plug 600 is shown removed from the cylinder head 300 by FIG. 8 and the second plug 602 is shown removed from the cylinder head 300 by FIG. 9. The second plug 602 is shown to have a cylindrical shape without the slot 618. For illustrative purposes, a dotted line 800 shown by FIG. 8 indicates a shape of a cylindrical plug that does not include the slot 618 (e.g., second plug 602) or sections having different diameters (as described below) relative to the shape of the first plug 600.

Figure 7:
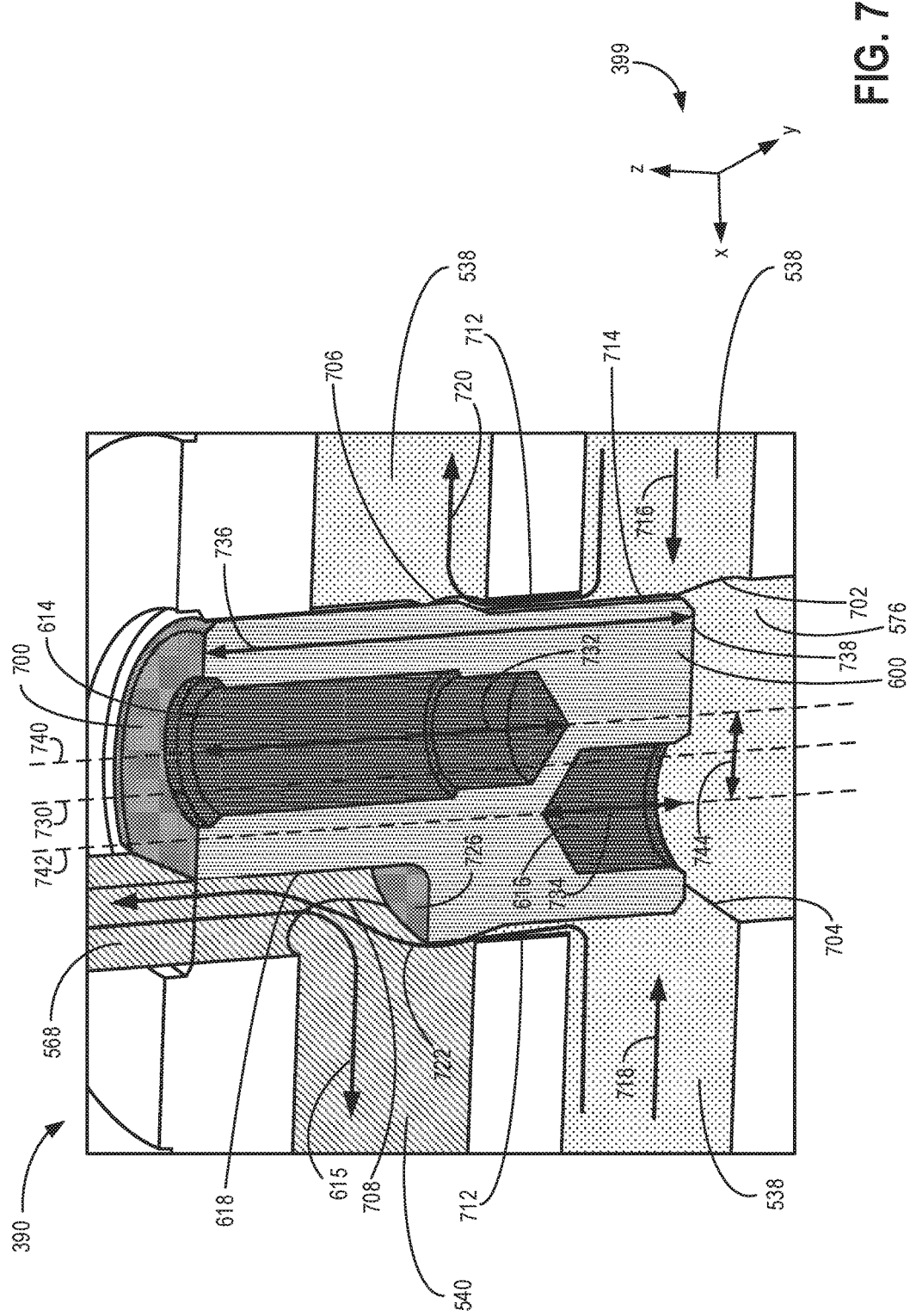
FIG. 7 shows an enlarged cross-sectional view of the first plug shown by FIG. 6.

The first plug 600 includes extraction feature 614 and assembly feature 616, and the third plug 604 includes extraction feature 606 and assembly feature 608. In some examples, the extraction feature 614 and extraction feature 606 may increase an ease with which the first plug 600 and third plug 604 (respectively) may be removed from the cylinder head 300 (e.g., removed from first oil chamber 576 and third oil chamber 534, respectively). For example, a user (e.g., technician) may insert a tool into extraction feature 614 to remove first plug 600 from first oil chamber 576 (e.g., by applying a pulling force, rotating the plug, etc.), or into extraction feature 606 to remove third plug 604 from the third oil chamber 534. The assembly feature 616 and assembly feature 608 may increase an ease with which the first plug 600 and third plug 604 (respectively) may be inserted and aligned with their corresponding oil chambers (e.g., first oil chamber 576 and third oil chamber 534, respectively). For example, the assembly feature 616 may be configured to align the first plug 600 with one or more surfaces of the first oil chamber 576, and the assembly feature 608 may be configured to align the third plug 604 with one or more surfaces of the third oil chamber 534. In one example (as shown by FIG. 7), the extraction feature 614 is a depression (e.g., a divot, recess, etc.) extending into an interior of the first plug 600 from a top surface 700 of the first plug 600. The extraction feature 614 may extend into the first plug 600 by a first length 732, with the first length 732 being less than a length 736 of the first plug 600 from the top surface 700 to a bottom surface 738 of the first plug 600. The top surface 700 is positioned opposite to the bottom surface 738 such that the length 736 is in a direction of a central axis 730 of the first plug 600 positioned normal to the top surface 700 and bottom surface 738. The assembly feature 616 is a depression formed by the bottom surface 738 and extending into the interior of the first plug 600 for a second length 734. The second length 734 is less than the length 736 such that the assembly feature 616 does not extend the entire length 736 from the bottom surface 738 to the top surface 700.

The extraction feature 614 and assembly feature 616 are offset from each other in a radial direction relative to the central axis 730. In particular, a first axis 740 positioned along an entire length of the extraction feature 614 (e.g., along the first length 732) is offset from a second axis 742 positioned along an entire length of the assembly feature 616 (e.g., along the second length 734) by a distance 744 in a radial direction of the central axis 730. In some embodiments, one or more of the extraction features of the plugs may be coupled to additional oil passages, ventilation passages, etc. of the engine oil system. In alternate embodiments, the extraction feature 614 and assembly feature 616 may not be offset from each other and may instead be positioned along a same axis (e.g., the central axis 730), with the extraction feature 614 and assembly feature 616 separated from each other by inner surfaces of the first plug 600. In other embodiments, the first plug 600 may include a different number of extraction features (e.g., one, three, etc.).

Second plug 602 includes a central passage 612 configured to couple with the oil passage 566 and flow oil from the oil passage 566 into a lower portion of the oil chamber 574 (e.g., a portion directly coupled to the first oil gallery 538).

The oil chambers 536, 562, and 564 positioned at the exhaust side 304 as shown by FIG. 5 include a similar configuration of plugs relative to those shown by FIG. 6 and described above (e.g., first plug 600 positioned in first oil chamber 576, second plug 602 positioned in second oil chamber 574, and third plug 604 positioned in third oil chamber 534).

One example of oil flow around the first plug 600 is shown by FIG. 7 and described below.

The first oil gallery 538 is coupled to the first oil chamber 576 by a first opening 702 (e.g., an aperture) and a second opening 704. In some examples, oil may flow into the first oil chamber 576 through first opening 702 along flow path 716, and oil may flow into the first oil chamber 576 through second opening 704 along flow path 718. The oil from flow path 718 may mix and/or converge with oil from flow path 716 within the first oil chamber 576.

Figure 8:
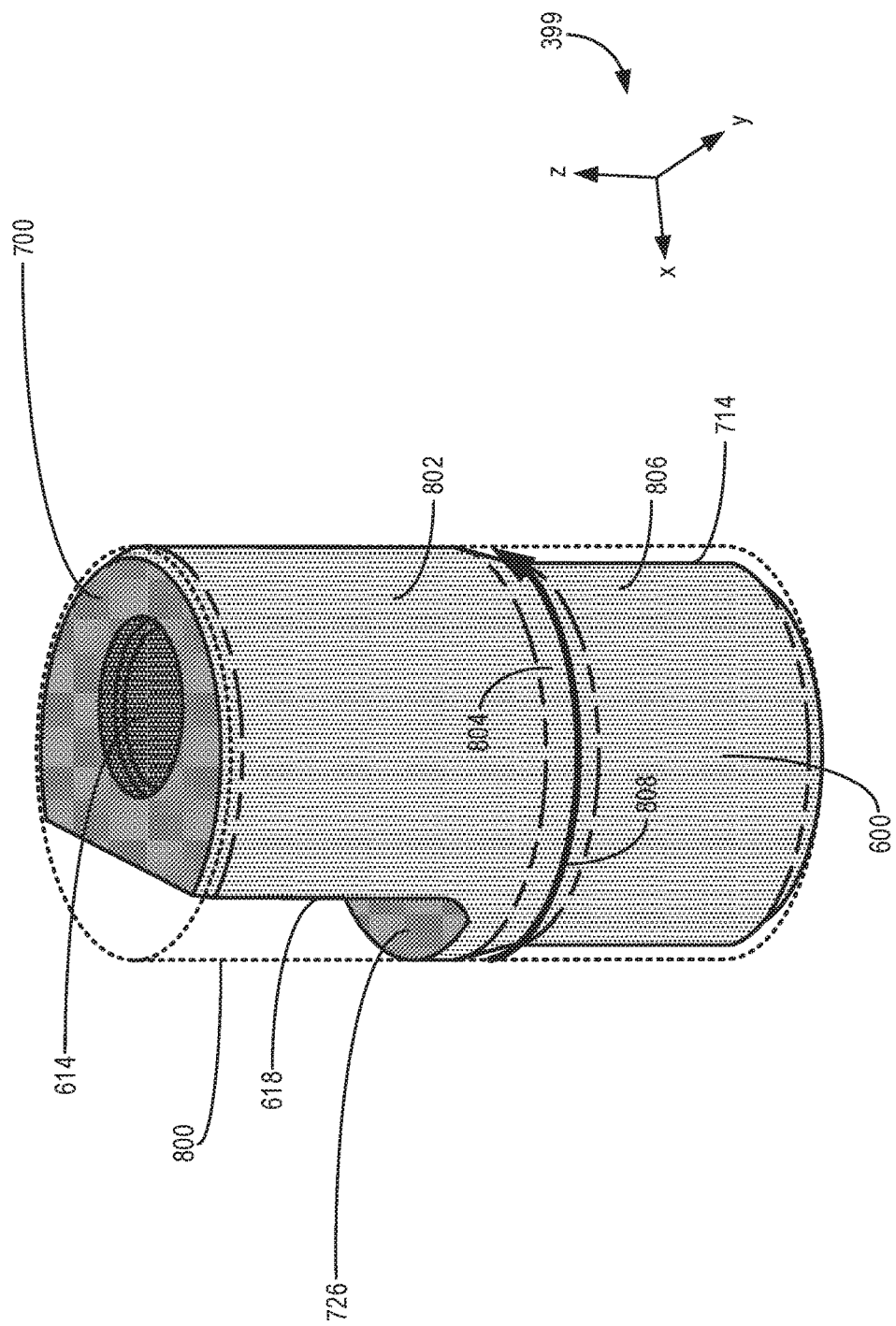
FIG. 8 shows the first plug shown by FIGS. 6-7 removed from the cylinder head.

The first plug 600 is shown by FIG. 8 to include a first section 802 and a second section 806 joined by a tapered section 804. The first section 802 has a first, larger diameter, and the second section 806 has a second, smaller diameter. The tapered section 804 has a diameter that tapers (e.g., reduces) from the first diameter to the second diameter in a direction from the first section 802 to the second section 806. In some examples, joining the first section 802 to the second section 806 via the tapered section 804 may reduce a likelihood of formation of burrs during coupling (e.g., insertion) of the first plug 600 into the first oil chamber 576. For example, because second section 806 includes a smaller diameter than the first section 802, the second section may have a reduced likelihood of coming into face-sharing contact with the inner surfaces of the first oil chamber 576 during installation of the first plug 600 into the first oil chamber 576. In some examples, the diameter of the first section 802 of the first plug 600 is slightly larger than an inner diameter of the first oil chamber 576, and the diameters of each of the tapered section 804 and the second section 806 are slightly smaller than the inner diameter of the first oil chamber 576. In this configuration, a clearance 712 (shown by FIG. 7) is formed between outer surfaces 714 of both of the tapered section 804 and the second section 806, and inner surfaces of the first oil chamber 576. In this way, the outer surfaces 714 of the tapered section 804 and the second section 806 may not have face-sharing contact with the inner surfaces of the first oil chamber 576. In some examples, the clearance 712 may have a width less than a first width (e.g., 0.030 millimeters) along the tapered section 804, and may have a width approximately equal to the first width along the second section 806, the width of the clearance 712 along the tapered section 804 defined as the distance between the outer surfaces of the tapered section 804 and the inner surfaces of the first oil chamber 576, and the width of the clearance 712 along the second section defined as the distance between the outer surfaces 714 of the second section 804 and the inner surfaces of the first oil chamber 576. Said another way, the width of the clearance 712 at the tapered section 804 may be defined as a difference between an inner diameter of the first oil chamber 576 and the outer diameter of the tapered section 804, and the width of the clearance 712 at the second section 806 may be defined as a distance between the inner diameter of the first oil chamber 576 and the outer diameter of the second section 806. In one example, oil within the first oil gallery 538 may flow through the first opening 702, through the clearance 712, and through a third opening 706 along flow path 720.

Oil within oil passage 568 may flow through the slot 618 of the first plug 600 (e.g., across stepped surface 726) and through a fourth opening 708 into the second oil gallery 540 along flow path 615. In some examples, the slot 618 (which may be referred to herein as a hole, aperture, etc.) may have a different size and/or shape relative to the examples shown by FIGS. 6-8. An oil flow from the second oil gallery 540 to the first oil gallery 538 is reduced through the clearance 712 relative to the flow of oil from the oil passage 568 into the second oil gallery 540. During some conditions (e.g., during conditions in which the a pressure of oil within the second oil gallery 540 is lower than a pressure of oil within the first oil gallery 538, such as conditions in which the solenoid valve fluidly coupled with the second oil gallery 540 is in a closed position and oil does not flow through the solenoid valve toward the second oil gallery 540), oil may flow from the first oil gallery 538 through the second opening 704, through the clearance 712, through the fourth opening 708, and into the second oil gallery 540 along flow path 722 toward a ventilation passage fluidly coupled to the solenoid valve (e.g., ventilation passage 221).

Another example of oil flow around the first plug 600 is shown by FIG. 8. Although the first plug 600 is shown removed from the cylinder head 300 by FIG. 8, oil may flow along a path similar to flow path 808 shown by FIG. 8 during conditions in which the first plug 600 is coupled to the cylinder head 300 (e.g., as shown by FIGS. 6-7). For example, oil may flow from the second opening 704 to the first opening 702 (and vice versa) along the tapered section 804 and/or the second section 806 and through the clearance 712. Said another way, oil may flow along flow path 808 across the outer surfaces 714 of the tapered section 804 and/or second section 806 and through the clearance 712 between the first opening 702 and the second opening 704.

FIG. 10 illustrates a method 1000 of operating an engine oil system included within an engine system (e.g., engine oil system 200 shown by FIG. 2 or engine oil system 390 shown by FIGS. 3-9). Some parts of the method 1000 may be performed passively and/or automatically (e.g., without actuation of the various actuators of the engine system and/or without signals transmitted to components of the engine oil system by a controller of the engine) and may be referred to herein as passive methods or automatic methods. Other parts of the method 1000 may be performed responsive to electrical signals transmitted by the controller to various components of the engine and/or engine oil system and may include actuating the various actuators (e.g., solenoid valves) of the engine system to adjust operating parameters of the engine and/or engine oil system. Such methods may be referred to herein as active methods. Instructions for carrying out the active methods of method 1000 and the rest of the methods included herein may be executed by the controller based on instructions stored on a memory of the controller and in conjunction with signals received from sensors of the engine system, such as the sensors described above with reference to FIG. 1 (e.g., pedal position sensor 134, exhaust gas sensor 128, camshaft position sensors 155 and 157, etc.). The controller may employ engine actuators of the engine system to adjust engine operation, according to the methods described below. For example, the controller may transmit electrical signals to one or more solenoid valves of the engine oil system in order to adjust an oil pressure within an oil gallery of the engine oil system, as described further below.

At 1002, the method includes estimating and/or measuring engine operating conditions. Engine operating conditions may be estimated based on one or more outputs of various sensors in the engine system (e.g., such as various temperature sensors, pressure sensors, camshaft position sensors, etc., as described above). Engine operating conditions may include engine speed and load, exhaust gas flow rate, mass air flow rate, coolant temperature, coolant flow rate, engine oil pressures (e.g., oil gallery pressures), operating modes of one or more intake valves and/or exhaust valves, etc. The operating conditions may also include the operating conditions of a plurality of solenoid valves of the engine oil system (e.g., amount of energization of the solenoid valves, amount of opening of the solenoid valves, etc.).

The method continues to 1004 where the method includes maintaining an oil pressure at a first level in a first oil gallery coupled to an oil inlet of a hydraulic lash adjuster. In one example, the first oil gallery, oil inlet, and hydraulic lash adjuster may be the first oil gallery 229, first oil inlet 289, and intake HLA 256 described above with reference to FIG. 2. In another example, the first oil gallery and hydraulic lash adjuster may be the first oil gallery 538 shown by FIGS. 5-7 and the intake HLA 334 shown by FIGS. 3-4. Maintaining the oil pressure at the first level within the first oil gallery may include flowing oil into the first oil gallery from a first location of a block of the engine (e.g., as indicated in FIG. 2 by first location 205). In some examples, the first level may be a first oil pressure (e.g., a pressure within a range of 2 bar to 4 bar) as described above with reference to FIG. 2. For example, the first level may be an amount of pressure resulting from oil flowing from the location 205 of the engine block through the first restrictor 209 shown by FIG. 2 and described above.

The method continues to 1006 where the method includes maintaining an oil pressure at a second level in a section of a second oil gallery coupled to an outlet of a solenoid valve and an oil inlet of a deactivatable rocker arm, the deactivatable rocker arm coupled to the hydraulic lash adjuster. In one example, the second oil gallery may be similar to the second oil gallery 231 shown by FIG. 2 or the second oil gallery 540 shown by FIGS. 5-7, the solenoid valve may be similar to the first solenoid valve 294 shown by FIG. 2, the outlet may be similar to the outlet 217 shown by FIG. 2, the section may be similar to the first section 245 shown by FIG. 2, the deactivatable rocker arm may be similar to the rocker arm 240 shown by FIG. 2, and the oil inlet may be similar to the inlet 275 shown by FIG. 2. Maintaining the oil pressure in the second oil gallery may include maintaining (e.g., not adjusting) an amount of opening of the solenoid valve (e.g., maintaining the solenoid valve in an opened position or a closed position). In some examples, the second level may be a second oil pressure (e.g., an oil pressure within a range of 0.1 bar to 0.3 bar) as described above with reference to FIG. 2, with the second level being lower than the first level during conditions in which the solenoid valve is in the closed position. In other examples (e.g., during conditions in which the solenoid valve is in an opened position), the second level may be an oil pressure greater than the first level (e.g., a pressure within a range of 2 bar to 4 bar and higher than the first level).

The method continues to 1008 where the method includes determining whether cylinder deactivation is desired (e.g., requested). For example, the deactivatable rocker arm coupled to the hydraulic lash adjuster may be configured to adjust an amount of opening of an intake valve of a cylinder of the engine, and at 1008 the controller may make a determination (e.g., a logical determination) of whether deactivation of the cylinder is desired based on engine operating conditions (e.g., based on signals received at the controller from various sensors of the engine). In one example, cylinder deactivation may be desired in order to reduce a fuel consumption of the engine (e.g., during conditions in which a torque demand of the engine is less than a threshold demand, such as during engine idling).

If cylinder deactivation is desired at 1008, the method continues to 1010 where the method includes energizing the solenoid valve to adjust the oil pressure at the oil inlet of the deactivatable rocker arm. In one example, the controller may transmit electrical signals to the solenoid valve (e.g., first solenoid valve 294) in order to increase an amount of opening of the solenoid valve and to increase a flow of oil into the section of the second oil gallery (e.g., first section 245 of second oil gallery 231) coupled to the deactivatable rocker arm (e.g., rocker arm 240). Increasing the flow of oil into the section of the second oil gallery coupled to the deactivatable rocker arm includes increasing a flow of oil through a slot (e.g., slot 618) formed in a slotted plug (e.g., first plug 600), with the slotted plug housed within an oil chamber (e.g., first oil chamber 576). The slot of the slotted plug fluidly couples the solenoid valve to the section of the second oil gallery. As a result of energization of the solenoid valve and increase flow of oil through the slot of the slotted plug into the section of the second oil gallery, the deactivatable rocker arm is adjusted to a deactivated mode in which a rotational motion of a cam (e.g., of a camshaft of the engine) configured to engage the rocker arm is not converted into a linear motion of the intake valve (e.g., via a pivoting motion of the deactivatable rocker arm). As a result, the deactivatable rocker arm does not pivot to open the intake valve (e.g., intake valve 150) coupled to the deactivatable rocker arm, thereby deactivating the intake valve coupled to the deactivatable rocker arm.

The controller may determine a control signal to send to the solenoid valve, with a pulse width of the signal being determined based on an amount of energization of the solenoid valve required to adjust the deactivatable rocker arm to the deactivated mode (by increasing the oil pressure within the section of the second oil gallery coupled to the deactivatable rocker arm as described above with reference to FIG. 1). The amount of energization of the solenoid valve may be based on a measured oil pressure within the second oil gallery, or determined based on operating conditions such as engine temperature, oil flow rate to the solenoid valve, etc. The controller may determine the pulse width through a determination that directly takes into account a determined oil pressure within the section of the second oil gallery, such as increasing the pulse width with decreasing oil pressure. The controller may alternatively determine the pulse width based on a calculation using a look-up table with the input being oil pressure within the section of the second oil gallery and the output being pulse-width. As another example, the controller may make a logical determination (e.g., regarding an amount of energization of the solenoid valve) based on logic rules that are a function of oil pressure within the section of the second oil gallery. The controller may then generate a control signal that is sent to the solenoid valve to adjust the amount of opening of the solenoid valve.

In another example, an amount of energization of the solenoid valve to adjust the oil pressure at the second oil inlet and deactivate the cylinder is empirically determined and stored in a predetermined lookup tables or functions. For example, one table may correspond to determining solenoid energization amounts and one table may correspond to determining oil pressure amounts at the second oil inlet. The two tables may be indexed to engine operating conditions, such as engine temperature and engine load, among other engine operating conditions. Furthermore, the tables may output an amount of solenoid valve energization and/or oil pressure at the second inlet at each cylinder cycle.

The method continues from 1010 to 1014 where the method includes flowing oil from the solenoid valve to the second oil gallery, and flowing oil within the first oil gallery and the second oil gallery across outer surfaces of the slotted plug. In one example, the slotted plug is similar to the plug 600 shown by FIGS. 6-8 and described above. The oil may flow through the solenoid valve due to the energization of the solenoid valve described above (e.g., due to the opened position of the solenoid valve). The oil flows from the solenoid valve through an oil passage (e.g., oil passage 568 shown by FIGS. 5-7), and the oil passage is fluidly coupled to the slot of the slotted plug. Oil flows through the slot from the oil passage to the second oil gallery and increases the oil pressure within the second oil gallery. Additionally, oil within the first oil gallery and the second oil gallery may flow across outer surfaces of the slotted plug as described below with reference to optional parts 1016 and 1018. The oil flows described herein with reference to 1016 and 1018 are passive and may not occur directly in response to signals transmitted by the controller to components of the engine oil system. For example, the oil may passively flow across the outer surfaces of the slotted plug without being pumped across the outer surfaces by an oil pump (e.g., via vibrational motions of the engine, surface tension of the oil, capillary action, pressure differentials, etc.).

The method at 1014 optionally includes passive part 1016, with 1016 including flowing oil within the second oil gallery to the first oil gallery through a clearance (e.g., clearance 712) between outer surfaces of the slotted plug and inner surfaces of an oil chamber (e.g., first oil chamber 576). For example, the pressure of oil within the second oil gallery at 1014 may be higher than the pressure of oil within the first oil gallery (e.g., due to the oil pressure increase within the second oil gallery as described above). Oil may flow from the second oil gallery to the first oil gallery through the clearance, with the clearance being much smaller than the oil passages of the first oil gallery and the second oil gallery (e.g., a width of the clearance being much less than a diameter of the oil passages). Due to the reduced size of the clearance relative to the oil passages, a flow rate of oil from the solenoid valve to the second oil gallery is much higher than a flow rate of oil from the second oil gallery to the first oil gallery through the clearance.

The method at 1014 may additionally and/or alternately include passive part 1018, with 1018 including flowing oil from a first portion of the first oil gallery to a second portion of the first oil gallery through the clearance. For example, oil may flow from a first portion (e.g., first oil passage) of the first oil gallery to a second portion (e.g., second oil passage) of the first oil gallery via the clearance (e.g., as illustrated by the flow path 720 shown by FIG. 7). In another example, oil may flow from the second portion of the first oil gallery to the first portion along a flow path opposite to the flow path 720.

If cylinder deactivation is not desired at 1008, the method continues to 1012 where the method includes not energizing the solenoid valve. In one example, not energizing the solenoid valve (e.g., not transmitting electrical signals to the solenoid valve via the controller) may move the solenoid valve into the closed position such that oil does not flow through the solenoid valve toward the inlet of the deactivatable rocker arm. Not energizing the solenoid valve may alternately maintain the solenoid valve in the closed position during conditions in which the solenoid valve is in the closed position immediately prior to the determination made at 1008 (e.g., immediately prior to 1008 during a single combustion cycle). By not energizing the solenoid valve, the oil pressure within the section of the second oil gallery coupled to the deactivatable rocker arm is not increased and the deactivatable rocker arm is not adjusted to the deactivated mode (e.g., the cylinder is not deactivated).

The method continues from 1012 to 1020 where the method includes flowing oil within the first oil gallery and the second oil gallery across outer surfaces of a slotted plug. In one example, the slotted plug is similar to the plug 600 shown by FIGS. 6-8 and described above. The oil flow described herein with reference to 1020 and the optional parts described below (e.g., 1022, 1024, and 1026) are passive and may not occur directly in response to signals transmitted by the controller to components of the engine oil system. For example, the oil may passively flow across the outer surfaces of the slotted plug without being pumped across the outer surfaces by an oil pump (e.g., via vibrational motions of the engine, surface tension of the oil, capillary action, pressure differentials, etc.).

The method at 1020 optionally includes 1022, with 1022 including flowing oil within the first oil gallery to the second oil gallery through a clearance (e.g., clearance 712) between outer surfaces of the slotted plug and inner surfaces of an oil chamber. For example, during conditions in which the solenoid valve is not energized as described above, an oil pressure within the first oil gallery may be higher than an oil pressure within the second oil gallery. As a result of the pressure differential between the first oil gallery and second oil gallery, oil may flow from the first oil gallery to the second oil gallery (e.g., through the clearance) and toward a ventilation passage (e.g., ventilation passage 221) coupled to the solenoid valve (e.g., along flow path 722 shown by FIG. 7).

The method at 1020 optionally includes 1024, with 1024 including flowing oil from the second oil gallery to a pressure relief outlet of the solenoid valve. For example, oil may flow from the second oil gallery through an oil passage (e.g., oil passage 568) to the solenoid valve. As the oil flows to the solenoid valve, air contained within the second oil gallery may flow with the oil to the solenoid valve. For example, at 1022, the flow of oil from the first oil gallery to the second oil gallery through the clearance may additionally flow air from the first oil gallery to the second oil gallery, and at 1024, the oil and air flow together to the pressure relief valve of the solenoid valve. The oil and air may flow out of the pressure relief valve, with the oil flowing into an oil pan of the engine and the air flowing into a crankcase of the engine (with the crankcase housing a crankshaft of the engine, such as crankshaft 140 shown by FIG. 1).

The method at 1020 optionally includes 1026, with 1026 including flowing oil from a first portion of the first oil gallery to a second portion of the first oil gallery through the clearance. As described above with reference to 1018, oil may flow from a first portion (e.g., first oil passage) of the first oil gallery to a second portion (e.g., second oil passage) of the first oil gallery via the clearance (e.g., as illustrated by the flow path 720 shown by FIG. 7). In another example, oil may flow from the second portion of the first oil gallery to the first portion along a flow path opposite to the flow path 720. Said another way, oil within the first oil gallery may circulate (e.g., mix and/or converge) between different passages of the first oil gallery via the clearance.

FIGS. 3-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

By configuring the cylinder valve actuation system in this way as described above, oil may flow from the first oil gallery to the second oil gallery through the clearances passively and without actuation of engine oil system components by the controller. The plugs may simplify the oil gallery configuration and reduce a size of the second oil gallery, thereby reducing a response time associated with adjusting the oil pressure within the second oil gallery and reducing a deactivation and/or activation time of cylinders coupled to the second oil gallery. Fluidly separating the second oil gallery into different sections via the plugs enables individual cylinders of the engine to be activated and/or deactivated independent relative to each other cylinder. Oil flowing through the clearance formed by each plug may reduce an amount of air present within the first oil gallery and second oil gallery, thereby reducing a likelihood of airflow into inlets of the deactivatable rocker arms and/or hydraulic lash adjusters. Reducing the amount of air within the engine oil system may reduce a likelihood of degradation of the oil system and increase an ease of maintenance of the system. Because air is compressible, reducing the amount of air in the engine oil system may increase a consistency of cylinder activation/deactivation response times by reducing an amount of time to adjust engine oil pressures. Additionally, due to the smaller size of the clearance, oil may flow through the clearance without any filters, thereby reducing a cost and/or maintenance time of the engine oil system. The technical effect of disposing the plugs within the oil chambers is to enable oil to flow through the clearances formed between the outer surfaces of the plugs and the oil chambers.

In one embodiment, a system comprises: a first plurality of oil passages, a second plurality of oil passages, and an oil chamber, all disposed within an engine cylinder head; a plug housed within the oil chamber and including a slot fluidly coupled to a first section of the second plurality of oil passages; and a clearance formed between the plug and the oil chamber, the clearance fluidly coupling the first and second pluralities of oil passages. In a first example of the system, a first section of the first plurality of oil passages and the first section of the second plurality of oil passages are each coupled to different openings of the oil chamber. A second example of the system optionally includes the first example, and further includes a solenoid valve fluidly coupled with the first section of the second plurality of oil passages by the slot of the plug. A third example of the system optionally includes one or both of the first and second examples, and further includes wherein the first section of the second plurality of oil passages is fluidly coupled to an inlet of a deactivatable rocker arm. A fourth example of the system optionally includes one or more or each of the first through third examples, and further includes a depression formed by a top surface or a bottom surface of the plug, the depression extending into an interior of the plug. A fifth example of the system optionally includes one or more or each of the first through fourth examples, and further includes wherein an axis of the depression is offset in a radial direction relative to a central axis of the plug. A sixth example of the system optionally includes one or more or each of the first through fifth examples, and further includes wherein a length of the depression is less than a length of the plug from the top surface to the bottom surface along a central axis of the plug.

In one embodiment, a method comprises: in response to a request to deactivate a cylinder valve, flowing oil from an oil passage of a cylinder head of an engine through a slot of a plug disposed within an oil chamber of the cylinder head and to a deactivatable rocker arm of the cylinder valve, the oil chamber formed between a first oil gallery and a second oil gallery; and flowing oil from the second oil gallery to the first oil gallery via a clearance formed between outer surfaces of the plug and the oil chamber. In a first example of the method, flowing oil from the second oil gallery to the first oil gallery via the clearance occurs while flowing oil from the oil passage through the slot and to the deactivatable rocker arm. A second example of the method optionally includes the first example, and further includes wherein flowing oil from the oil passage through the slot and to the deactivatable rocker arm includes energizing a solenoid valve fluidly coupled to the slot in order to increase a flow of oil through the solenoid valve from an engine block coupled to the cylinder head. A third example of the method optionally includes one or both of the first and second examples, and further includes wherein increasing the flow of oil from the engine block through the solenoid valve adjusts the deactivatable rocker arm to a deactivated mode by increasing a pressure of oil at an inlet of the deactivatable rocker arm. A fourth example of the method optionally includes one or more or each of the first through third examples, and further includes wherein adjusting the deactivatable rocker arm to the deactivated mode includes not pressing a rocker arm coupled to the deactivatable rocker arm against a cam of a camshaft of the engine. A fifth example of the method optionally includes one or more or each of the first through fourth examples, and further includes wherein flowing oil from the second oil gallery to the first oil gallery via the clearance includes flowing oil from a first opening of the oil chamber, through the clearance, and to a second opening of the oil chamber, with the first opening fluidly coupled to the second oil gallery and the second opening fluidly coupled to the first oil gallery. A sixth example of the method optionally includes one or more or each of the first through fifth examples, and further includes flowing oil from a first oil passage of the first oil gallery through a first opening of the oil chamber, through the clearance, and through a second opening of the oil chamber into a second oil passage of the first oil gallery.

In another embodiment, a system comprises: a cylinder head of an engine; a first oil gallery and a second oil gallery positioned within an interior of the cylinder head; a first oil chamber coupled to both the first oil gallery and the second oil gallery within the interior of the cylinder head, the first oil chamber including a first slotted plug disposed therein, with a slot of the first slotted plug fluidly coupling a first section of the second oil gallery to a first solenoid valve; a first deactivatable rocker arm fluidly coupled to the first section of the second oil gallery; and a clearance formed between the slotted plug and the oil chamber, the clearance fluidly coupling the first oil gallery to the second oil gallery. In a first example of the system, the system includes a second oil chamber coupled to both the first oil gallery and the second oil gallery within the interior of the cylinder head, the second oil chamber including a second slotted plug disposed therein, with a slot of the second slotted plug fluidly coupling a second section of the second oil gallery to a second solenoid valve. A second example of the system optionally includes the first example, and further includes wherein the second section of the second oil gallery is fluidly coupled to a second deactivatable rocker arm. A third example of the system optionally includes one or both of the first and second examples, and further includes a third oil chamber coupled to both the first oil gallery and the second oil gallery within the interior of the cylinder head and positioned between the first oil chamber and the second oil chamber, the third oil chamber including a non-slotted plug disposed therein, with the plug fluidly separating the first section of the second oil gallery from the second section of the second oil gallery. A fourth example of the system optionally includes one or more or each of the first through third examples, and further includes a first oil inlet of an engine block fluidly coupled to the first oil gallery, and further comprising a second oil inlet of the engine block fluidly coupled to the second oil gallery via the first solenoid valve and the second solenoid valve. A fifth example of the system optionally includes one or more or each of the first through fourth examples, and further includes wherein the first oil inlet includes oil at a first oil pressure and the second oil inlet includes oil at a second oil pressure, with the second oil pressure being greater than the first oil pressure.

In another representation, a vehicle comprises: a cylinder head of an engine; a first oil gallery and a second oil gallery positioned within an interior of the cylinder head; a first oil chamber coupled to both the first oil gallery and the second oil gallery within the interior of the cylinder head, the first oil chamber including a first slotted plug disposed therein, with a slot of the first slotted plug fluidly coupling a first section of the second oil gallery to a first solenoid valve; a first deactivatable rocker arm fluidly coupled to the first section of the second oil gallery; a clearance formed between the slotted plug and the oil chamber, the clearance fluidly coupling the first oil gallery to the second oil gallery; an electric machine; and a transmission selectively mechanically coupled to the electric machine or to the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
   an engine cylinder head comprising a first plurality of oil passages, a second plurality of oil passages, and an oil chamber disposed within the engine cylinder head;
   a plug housed within the oil chamber and including a slot fluidly coupled to a first section of the second plurality of oil passages; and
   a clearance formed between the plug and the oil chamber, the clearance fluidly coupling the first and second pluralities of oil passages.

2. The system of claim 1, wherein a first section of the first plurality of oil passages and a first section of the second plurality of oil passages are each coupled to different openings of the oil chamber.

3. The system of claim 2, further comprising a solenoid valve fluidly coupled with the first section of the second plurality of oil passages by the slot of the plug.

4. The system of claim 2, wherein the first section of the second plurality of oil passages is fluidly coupled to an inlet of a hydraulic lash adjuster.

5. The system of claim 1, further comprising a depression formed by a top surface or a bottom surface of the plug, the depression extending into an interior of the plug.

6. The system of claim 5, wherein an axis of the depression is offset in a radial direction relative to a central axis of the plug.

7. The system of claim 5, wherein a length of the depression is less than a length of the plug from the top surface to the bottom surface along a central axis of the plug.

8. A system, comprising:
   a cylinder head of an engine;
   a first oil gallery and a second oil gallery positioned within an interior of the cylinder head;
   a first oil chamber coupled to both the first oil gallery and the second oil gallery within the interior of the cylinder head, the first oil chamber including a first slotted plug disposed therein, with a slot of the first slotted plug fluidly coupling a first section of the second oil gallery to a first solenoid valve;
   a first deactivatable rocker arm fluidly coupled to the first section of the second oil gallery; and
   a clearance formed between the first slotted plug and the first oil chamber, the clearance fluidly coupling the first oil gallery to the second oil gallery.

9. The system of claim 8, further comprising a second oil chamber coupled to both the first oil gallery and the second oil gallery within the interior of the cylinder head, the second oil chamber including a second slotted plug disposed therein, with a slot of the second slotted plug fluidly coupling a second section of the second oil gallery to a second solenoid valve.

10. The system of claim 9, wherein the second section of the second oil gallery is fluidly coupled to a second deactivatable rocker arm.

11. The system of claim 10, further comprising a third oil chamber coupled to both the first oil gallery and the second oil gallery within the interior of the cylinder head and positioned between the first oil chamber and the second oil chamber, the third oil chamber including a non-slotted plug disposed therein, with the non-slotted plug fluidly separating the first section of the second oil gallery from the second section of the second oil gallery.

12. The system of claim 10, further comprising a first oil inlet of an engine block fluidly coupled to the first oil gallery, and further comprising a second oil inlet of the engine block fluidly coupled to the second oil gallery via the first solenoid valve and the second solenoid valve.

13. The system of claim 12, wherein the first oil inlet includes oil at a first oil pressure and the second oil inlet includes oil at a second oil pressure, with the second oil pressure being greater than the first oil pressure.

* * * * *